US010140465B2

(12) United States Patent
Olsen-Kreusch

(10) Patent No.: US 10,140,465 B2
(45) Date of Patent: *Nov. 27, 2018

(54) METHODS AND SYSTEMS FOR USER AUTHENTICATION IN A COMPUTER SYSTEM USING MULTI-COMPONENT LOG-INS, INCLUDING IMAGE-BASED LOG-INS

(71) Applicant: Susan Olsen-Kreusch, Wauconda, IL (US)

(72) Inventor: Susan Olsen-Kreusch, Wauconda, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/623,179

(22) Filed: Jun. 14, 2017

(65) Prior Publication Data
US 2017/0286712 A1 Oct. 5, 2017

Related U.S. Application Data

(63) Continuation of application No. 15/197,899, filed on Jun. 30, 2016, now Pat. No. 9,710,666, which is a (Continued)

(51) Int. Cl.
*G06F 7/04* (2006.01)
*G06F 15/16* (2006.01)
(Continued)

(52) U.S. Cl.
CPC .......... *G06F 21/6218* (2013.01); *G06F 21/36* (2013.01); *G06F 21/45* (2013.01);
(Continued)

(58) Field of Classification Search
USPC ................................................. 726/4, 5, 6, 7
See application file for complete search history.

(56) References Cited

U.S. PATENT DOCUMENTS 5,928,364 A 7/1999 Yamamoto
7,644,433 B2 1/2010 Mizrah
(Continued)

FOREIGN PATENT DOCUMENTS

CN 102081488 6/2011

OTHER PUBLICATIONS

Suo, X., Zhu, Y & Owens, G.S.; Graphical passwords: A survey; Proceedings of the 21st Annual Computer Security Applications Conference 2005 (ACSAC 2005); 2005; 10 pages; 1063-9527/05; IEEE Computer Society.
(Continued)

*Primary Examiner* — Brandon S Hoffman
*Assistant Examiner* — Samuel Ambaye
(74) *Attorney, Agent, or Firm* — Cambridge Technology Law LLC; Maura K. Moran

(57) ABSTRACT

In computer-based user authentication, a user may establish or enhance security for a component of a multi-component password by performing a security operation on a selected component of the password. The security operation may comprise encrypting the selected component. The password may be an image-based password and security operation may be encrypting information related to positions of at least one target location on a verification image.

12 Claims, 17 Drawing Sheets

(51) Int. Cl.
  *G06F 17/30* (2006.01)
  *H04L 29/06* (2006.01)
  *G06F 21/62* (2013.01)
  *G06F 21/36* (2013.01)
  *G06F 21/45* (2013.01)
  *G06F 21/60* (2013.01)
  *H04L 9/32* (2006.01)

(52) U.S. Cl.
  CPC .......... *G06F 21/602* (2013.01); *H04L 9/3226* (2013.01); *H04L 9/3234* (2013.01)

(56) References Cited

U.S. PATENT DOCUMENTS

| | | |
|---|---|---|
| 7,734,930 B2 | 6/2010 | Kirovski et al. |
| 8,090,201 B2 | 1/2012 | de Leon |
| 9,411,950 B1 | 8/2016 | Olsen-Kreusch |
| 9,710,666 B2 | 7/2017 | Olsen-Kreusch |
| 2004/0230843 A1 | 11/2004 | Jansen |
| 2009/0083850 A1 | 3/2009 | Fadell et al. |
| 2012/0023574 A1 | 1/2012 | Osborn et al. |
| 2012/0036573 A1 | 2/2012 | Yang |
| 2012/0159616 A1 | 6/2012 | Griffin et al. |
| 2015/0242604 A1* | 8/2015 | Brown .................... G06F 21/31 726/17 |

OTHER PUBLICATIONS

Lin, P.L., Tung, W.L & Huang, P.W.; Graphical passwords using images with random tracks of geometric shapes; Congress on Image and Signal Processing 2008 (CISP '08); 2008; pp. 27-31, 978-0-7695-3119-9/08; IEEE Computer Society.

* cited by examiner

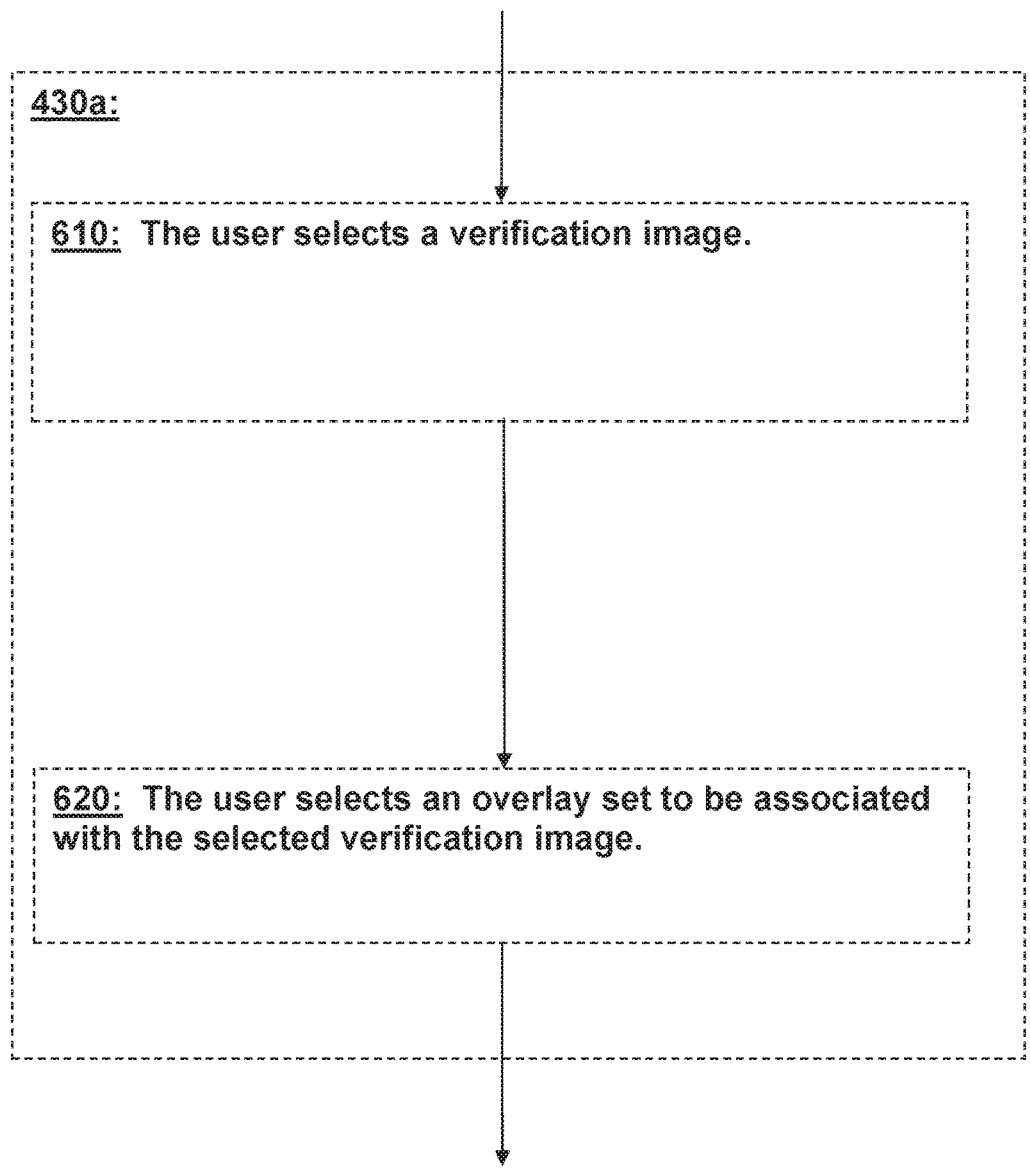

FIG. 11

| Target Location | Grid Location (X,Y)/ TL Password | Small Selection Mechanism | Large Selection Mechanism |
|---|---|---|---|
| Sun 1020 | Cells (5, 2), (6, 2), (4, 3) – (7, 3), (5, 4) – (7,4) | Cells (5, 3) – (6, 4) | Cells (4, 2) – (7, 4) |
| | (flower, Tt%, [flower], 3, *, 143, &, @@) | (3, *, &, @@) | (Ab, flower, Tt%, 1.1, [flower], 3, *, 143, [lightning], &, @@, T) |
| Sun Ray 1022 | Cell (5, 4) | Cell (5, 4) | Cells (4, 4) – (5,4) or (4,3) – (5,4) |
| | (&) | (&) | ([lightning], &) or ([flower], 3, [lightning], &) |
| Sun Ray 1024 | Cells (6, 3) – (7, 3) | Cell (6, 3) or (6-3) – (7, 3) | Cells (6, 3) – (7, 4) |
| | (*, 143) | (*) or (*, 143) | (*, 143, @@, T)) |

FIG. 12

1200: Establishing Additional Security for a Component of a Multi-Component Password

1210: Receive, using processor 190 and communication module 340, a request to establish additional security of a component of a multi-component password.

1215: Select encryption as the additional security and a target location as the component to encrypt.

1220: Define a grid, including its size to be associated with verification images of the verification image/key definition combinations.

1230: With the grid module 290, populate grid cells with elements of content. Ensure unique content for a set of contiguous cells that define a target location or a potential target location.

1240: Store information about the established grid definition in storage; using communication module, transmit information about the established grid definition for storage at users' devices.

1250: Replace or re-shuffle the elements of content in a grid in order to redefine target location passwords.

1260: Store information about the revised grid definition in storage; using communication module, transmit information about the revised grid definition for storage at users' devices.

METHODS AND SYSTEMS FOR USER AUTHENTICATION IN A COMPUTER SYSTEM USING MULTI-COMPONENT LOG-INS, INCLUDING IMAGE-BASED LOG-INS

CROSS-REFERENCE TO RELATED APPLICATION

This application claims the benefit at least in part of the filing date of U.S. patent application Ser. No. 14/306,226, for Methods and Systems for User Authentication in a Computer System Using Image-Based Log-Ins, filed Jun. 17, 2014, now U.S. Pat. No. 9,411,950, and U.S. patent application Ser. No. 15/197,899, for Methods and Systems for User Authentication in a Computer System Using Multi-Component Log-Ins, Including Image-Based Log-Ins, which is currently pending and is a Continuation-In-Part of U.S. patent application Ser. No. 14/306,226, the entire disclosure of both of which is hereby incorporated by reference.

FIELD

This application relates generally to authenticating a user of a computer system to prove user identity or to approve access to a resource such as a computer system.

BACKGROUND

Computer applications traditionally require a user to log in by providing information to verify the user's identity (typically account name and password). Such passwords are usually a series of letters, numbers, and symbols. Because often such log-ins are in public spaces, such as at Automated Teller Machines (ATMs), a user runs the risk of being watched during the login process and having his password discovered. For example, a thief could surreptitiously watch the login transaction and thus capture the user name and password. In addition, if the user login attempt is performed over the Internet, the user name and password could be collected using malicious software, also known as malware. However the sensitive information is collected, the thief could then himself log in to the user's account using the misappropriated username and password, and conduct business posing as the user.

The cost to affected users and businesses of computer-based fraud is enormous. Many users find themselves responsible for paying for purchases that they did not make. Their banks and credit card companies often assume the responsibility for the debt. In response to the security threat provided by such fraud, many banks and businesses, especially those that sell mainly over the Internet, provide fraud insurance or guarantees to users. In addition, they invest in extensive computer security measures designed to protect against computer-based fraud.

Certain solutions have been suggested to make logins more secure. For example, some systems require multiple passwords from users before they can obtain access to a computer. Users are sometimes presented with challenge questions, to which they need to remember details from their past or answers that may change over time (What was your high school/first pet/first date? What is your favorite food/drink/book/movie? Who is your best friend?) Users are advised to avoid using the same password over and over. If a user must maintain and/or remember multiple complicated passwords for disparate applications, from a usability perspective, access to computer applications becomes considerably less convenient whether the desired applications are accessed through disparate locations, such as locally, on a local network, or over the Internet. In addition, many passwords are text based which make them vulnerable to misappropriation by thieves.

Therefore, it is desirable to have a login system for computer applications that is simple, easy for the user to remember, difficult for the hacker to misappropriate, and takes into account the modern reality of our access to multiple computer applications through disparate locations, whether locally, on a local network, or over the Internet.

SUMMARY

An improvement is disclosed in computer-based user authentication, in which security for a password having a plurality of components are established or enhanced by performing a security operation on a selected component of the password. A request to establish or enhance security for the password may be received, into a memory of a computer system processor and, in response to receiving the request, a security operation may be performed on a selected component of the password. In certain embodiments, the security operation has not been performed on at least one other component of the multi-component password. In other embodiments, the security operation may be encrypting the selected component.

In still further embodiments, the multi-component password may be an image-based password having a verification image with at least one target location, which is at least one region of the verification image upon which at least one action may be applied. The target location further may be a portion of regions on the verification image upon which actions could be applied. The selected component upon which a security operation is performed may be a set of the target locations; and the security operation may be encryption of information related to the positions of the target locations on the verification image.

In further embodiments, the encryption may involve establishing a grid for the verification image to uniquely identify the positions of the target locations on the verification image by grid cells associated therewith. The grid cells may be populated with elements of content in order to define an encryption of the identified positions of the target locations on the verification image based on the content of the grid cells associated with the positions of the target locations. Information related to the grid and its grid cells may be maintained at a user processor and at the computer system for use in encrypting and decrypting the identified positions of the target locations on the verification image. In still further embodiments, the encryption of the identified positions of the target locations on the verification image may be redefined by modifying the elements of content in the grid cells and storing information related to the modified grid cells at the user processor and at the computer system so that, in future, ongoing encryption and decryption of the identified positions of the target locations on the verification image may be based on the modified grid cells.

In certain embodiments, a system may comprise a processor, a memory, and a non-transitory computer-readable medium encoding instructions for execution by the processor, programmed to cause the processor to execute the methods described above.

In other embodiments, one or more computer-readable, nontransitory media, having stored thereon one or more computer programs programmed to cause a computer to perform the methods described above.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 6 is a block diagram of an alternative embodiment of a stage for the user selecting a verification image/key definition combination in the image-based log-in set-up application of FIG. 4;

FIG. 8b is a diagrammatic representation of the display screen of FIG. 8a, with an exemplary image-based, overlay-based, and multi-selection patterned key applied to the verification image of FIG. 8a;

FIG. 11 is a diagrammatic representation of grid cells associated with selected target locations shown in FIG. 10, and the target location encryptions developed from the content associated with the grid cells; and FIG. 12 is a flowchart representation of a process 1200 for encrypting components of the image-based password.

DETAILED DESCRIPTION

Figure 1:
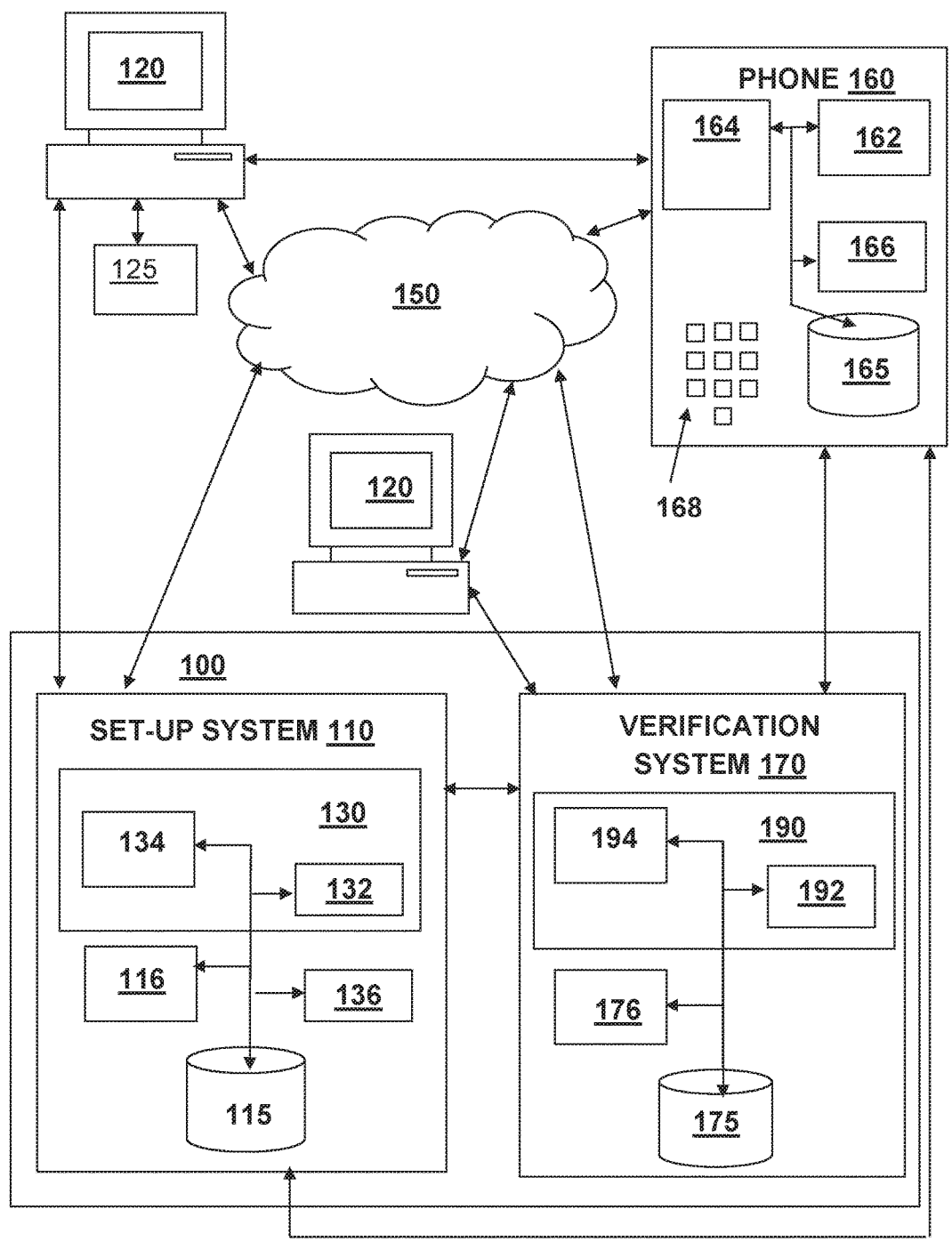
FIG. 1 is a block diagram of an exemplary computer-based user authentication system.

Reference will now be made in detail to the present exemplary embodiments, examples of which are illustrated in the accompanying drawings. Wherever possible, the same reference numbers will be used throughout the drawings to refer to the same or like parts.

Image-Based Authentication System 100

An image-based authentication system 100 according to the present invention will now be described in detail with reference to FIGS. 1 to 3 of the accompanying drawings. The authentication system 100 is an image-based sign-in system providing user authentication based on the user performing a set of actions on at least one verification image on a display screen. The user authentication may be for the purposes of proving user identity or approving access to a resource such as a computer system.

The authentication system 100 has a set-up system 110 for that allows a user to select multiple verification images and to establish a key to be associated with each of the verification images. For further security, the user may design a unique key for each of the multiple verification images. The authentication system 100 also has a verification system 170 for presenting one of the selected multiple verification images to a user, allowing the user to input a key associated with each of the verification images, and authenticating the user based on the success of the input of the key by the user.

The set-up system 110 has at least one processor such as a server 130, which hosts an application 132 for providing an authentication set-up website 134 for establishing passwords for computer-based user authentication and, and a user information module 116 for use in accessing a storage unit 115. The application 132 may have computer implementable instructions encoded in a non-transitory computer-readable medium for execution by a processor such as the server 130. The storage unit 115 may be used for storing instructions such as in application 132 and data for operating the website 134 and populating the website with information about setting up image-based passwords, verification images with which to associated passwords, and components for the keys to be established.

The authentication system 100 also has a verification system 170 for presenting one of the multiple verification images to a user, allowing the user to supply the key associated with the verification image, and authenticating the user based on the success of the input of the key by the user. The verification system 170 has at least one processor such as a server 190, which hosts an application 192 for providing a verification website 134 for computer-based user authentication, and a user information module 176 for use in accessing a storage unit 175. The application 192 may have computer implementable instructions encoded in a non-transitory computer-readable medium for execution by a processor such as server 190. The storage unit 175 may be used for storing instructions such as in application 192 and data for operating the website 194 and populating the website with information about verifying authentication with verification images setting up image-based passwords.

Interaction with the Image-Based Authentication System 100

Users of the system 100 may communicate with the servers 130, 190 and access the website 134, 194 using computer 120. Computer 120 may be a remote special-purpose computer at a location such as a bank or mall, or it may be their own computer such as a desktop computer, laptop computer, tablet, or any other conventional or known computing devices. Users of the system 100 may also communicate with the servers 130, 190 and access the websites 134, 194 using a telephone such as a mobile telephone 160 that may communicate with their own computers 120 or to the server 130, 190.

The user's telephone 160 may have a processor which hosts an application 162 for facilitating access to the authentication system 100, and for providing on-line access for the user. The telephone 160 may also have a display 167 for displaying information from the authentication system 100. The telephone may also have an integrated storage device 165 for storing instructions and data for operating the telephone 160, for managing interactions with the authentication system 100, and for managing the on-line connections. The telephone 160 may also have a user information module 166 for use in accessing the integrated storage device 165. The telephone 160 may also have a keypad 168 for use in telephoning, providing instructions to the telephone processor, and inputting other data, such as capturing actions for establishing keys, and for inputting keys to authenticate use of a computer or application.

Figure 2:
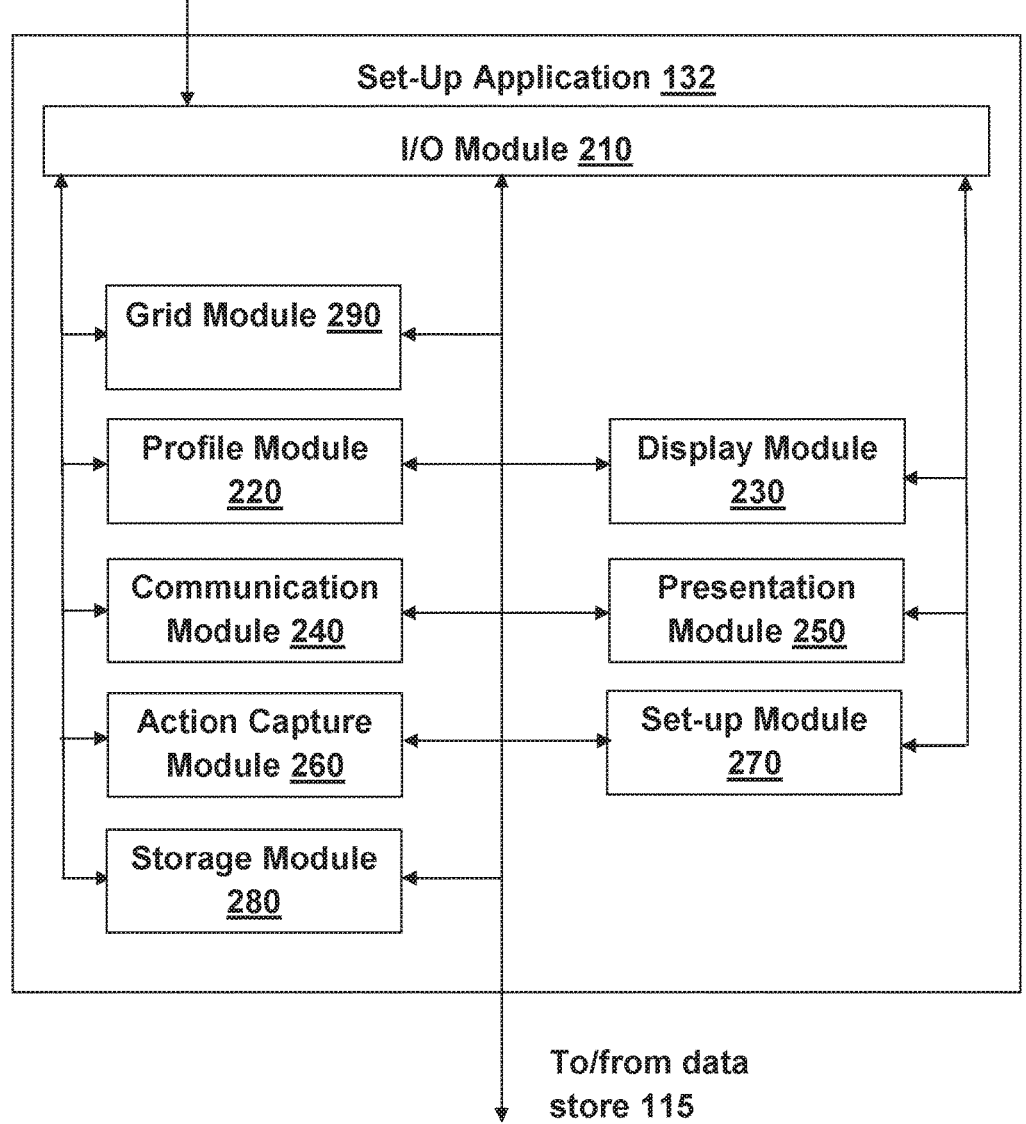
FIG. 2 is a block diagram of a set-up application for use in the computer-based user authentication system in FIG. 1.

As shown in FIG. 2, the application 132 may have an I/O module 210 to process communications to and from the server 130. The application 132 may have a profile module 220 for developing a website profile page that may be customized to the user, and a display module 230 for facilitating the display of the website pages.

The application 132 may also have modules for providing other features, functionality, and pages of the website 134, such as a communication module 240 for issuing and processing instructions from the user computer 120 or phone 160, a presentation module 250 for presenting verification image candidates to the user at computer 120, an action capture module 260 for capturing actions defined by the user as components of the challenge key to be associated with the challenge verification image, an association module 270 for associating the challenge key definition with the challenge verification image to form a new verification image/key definition combination, and a storage module 280 for storing information related to the new verification image/key definition combination with the user information on the server.

Figure 3:
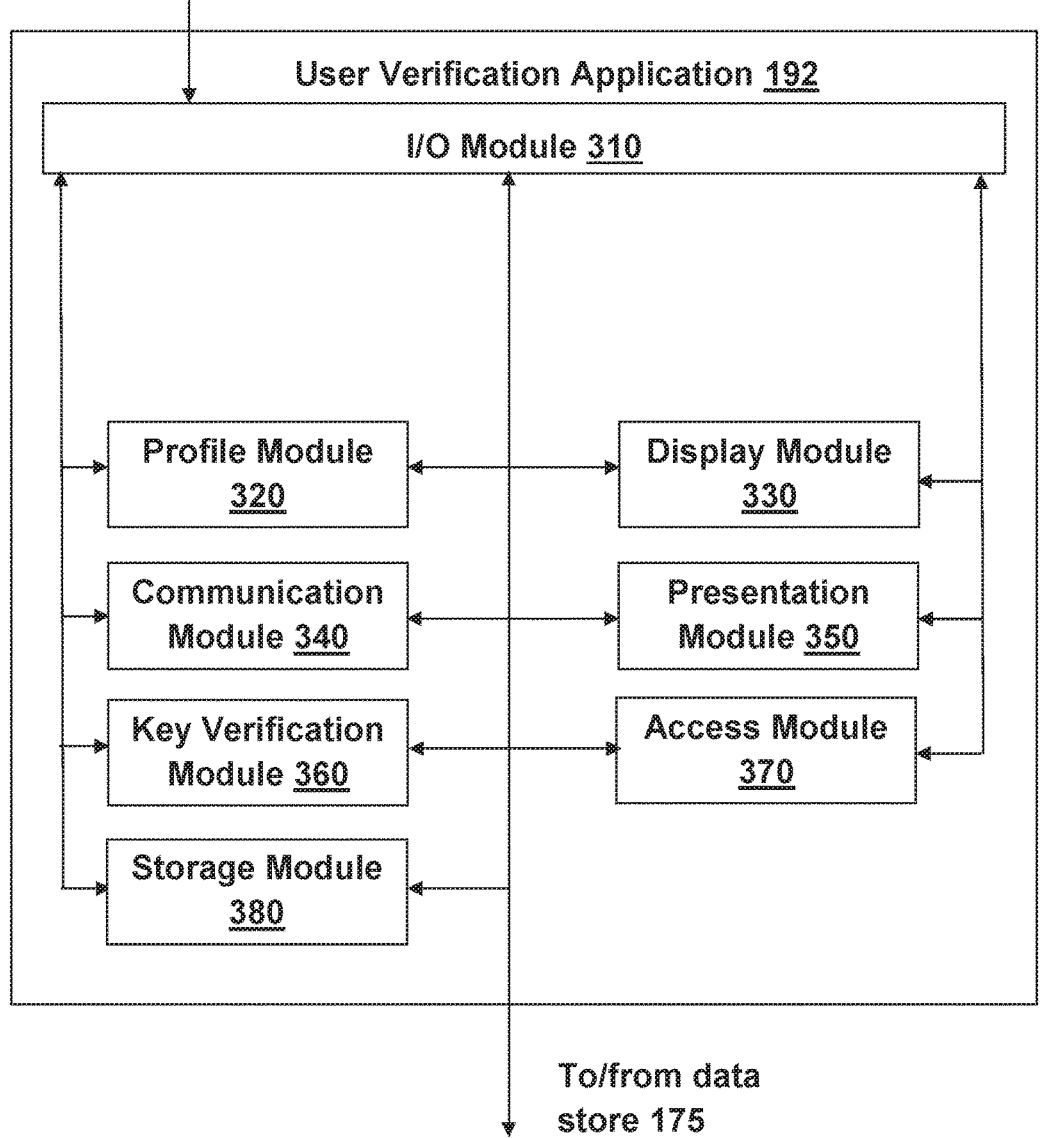
FIG. 3 is a block diagram of a user verification application for use in the computer-based user authentication system in FIG. 1.

As shown in FIG. 3, the application 192 may have an I/O module 310 to process communications to and from the server 190. The application 192 may have a profile module 320 for developing a website profile page that may be customized to the user, and a display module 330 for facilitating the display of the website pages.

The application 192 may also have modules for providing other features, functionality, and pages of the website 194, such as a communication module 340 for issuing and processing instructions from the user computer 120 or phone 160, a presentation module 350 for presenting verification image candidates to the user at computer 120, a verification module 360 for verifying keys inputted by users, an access module 370 for generating and issuing an authorization that allows the user to access the application, and a storage module 380 for storing information related to the new verification image/key definition combination with the user information on the server.

The components depicted in the Figures may be operatively connected to one another via a network, such as the Internet 150 or an intranet, or via any type of wired or wireless communication system. Connections may be implemented through a direct communication link, a local area network (LAN), a wide area network (WAN) and/or other suitable connections.

One skilled in the art will appreciate that although only one or two of the components identified above is depicted in the Figures, any number of any of these components may be provided. Furthermore, one of ordinary skill in the art will recognize that there may be more than one phone 160, or more that two computers 120, and that functions provided by one or more components of any of the disclosed systems may be combined or incorporated into another component shown in the Figures.

One or more of the components depicted in FIG. 1 may be implemented in software on one or more computing systems. For example, they may comprise one or more applications, which may comprise one or more computer-readable instructions which, when executed by a processor, cause a computer to perform steps of a method, or they may be combined to provide multiple functionalities. Further, while the modules are shown in the figures as associated with a specific processor, such as servers 130, 190 or telephone 160, or system, such as systems 130, 170, it is to be understood that the module may operate on any other processor shown or not shown or it may be a standalone program.

Further, the instructions for the module may be stored on the storage device associated with the specific processor or any other storage device, or they may be stored on one or more storage devices, and transferred to run on the shown processor or other or multiple processors. Computer-readable instructions may be stored on a computer-readable medium, such as a memory or disk. Such media typically provide non-transitory storage. Alternatively, one or more of the components depicted in FIG. 1 may be hardware components or combinations of hardware and software such as, for example, special purpose computers or general purpose computers. A computer or computer system may also comprise an internal or external database. The components of a computer or computer system may connect through a local bus interface.

The databases and storage units shown in FIG. 1 may be implemented as separate databases and repositories as shown in FIG. 1 or as one or more internal databases stored, for example, on the server 110. Storage units 115, 175 may be accessed by other components in system 100 directly via an external connection or via a network (not shown). Further, the user interfaces employed by the set-up system and the verification system, as shown in FIG. 1, may be integrated into the systems 120, 160, or they may be separate units.

Establishing a Verification Image/Key Definition Combination

Figure 4:
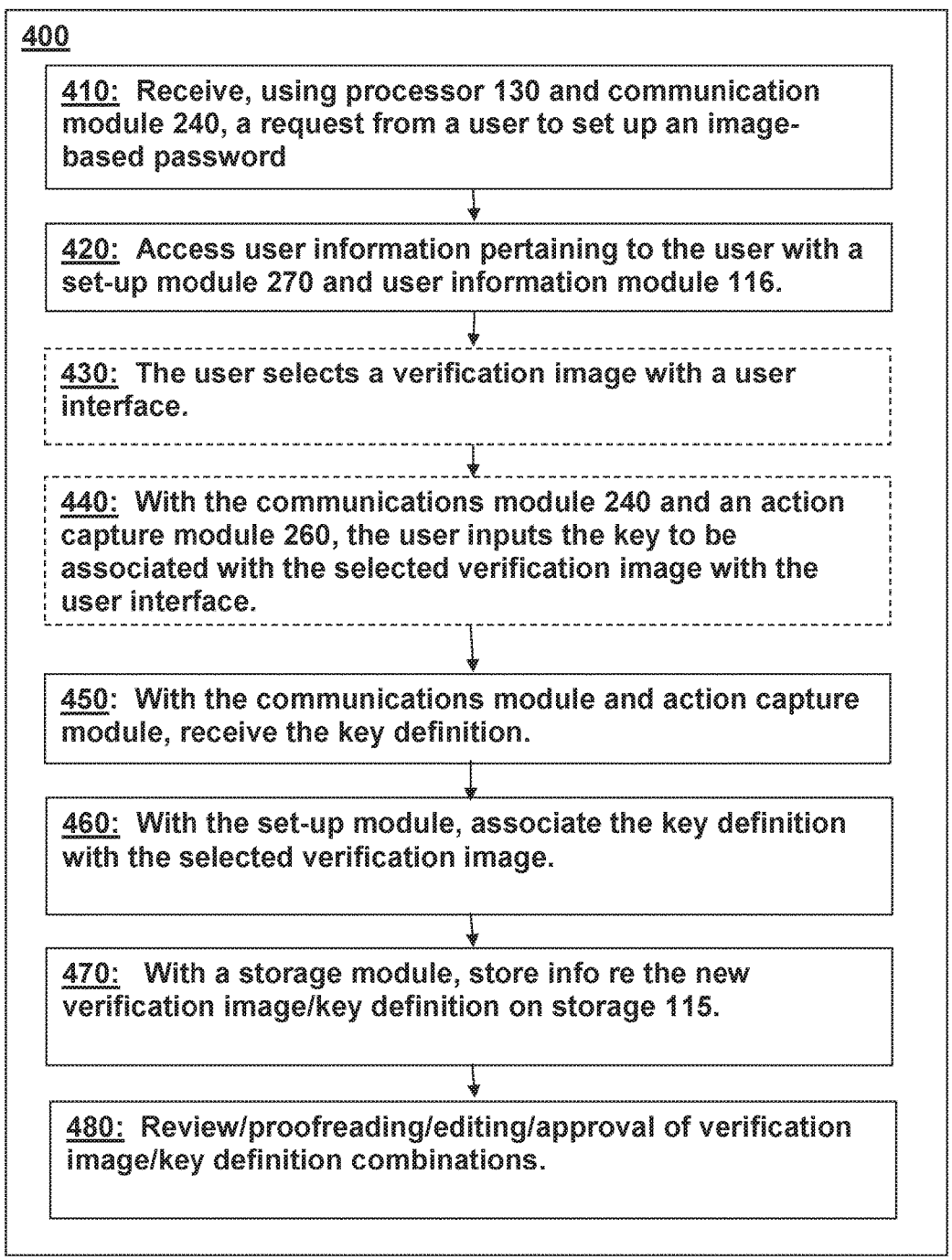
FIG. 4 is a block diagram of an embodiment of the image-based log-in set-up application of FIG. 3.

In certain embodiments, the image-based passwords for computer-based user authentication may be established by the user. FIG. 4 illustrates an exemplary process 400 for establishing a verification image and a key to be associated with it. In one embodiment, in a stage 410, using the processor 130 and the communication module 240, a request may be received from a user to set up an image-based password for a challenge verification image. In response to receiving the request, in a stage 420, a set-up module 270 may access information pertaining to the user with a profile module 220 and prepares to receive the user's selection of a challenge verification image.

In a stage 430, the user may select the challenge verification image with the user interface. The user interface may be any conventional interface, with a keyboard, screen, mouse, touch screen, and any other useful components. The number of verification images to be established by a user may be any number desired by the designer of the set-up system 110. For example, the designer may choose to allow for 2-10 verification images. The verification image may be any suitable image having one or more potential target locations. For example, it may be a photo or drawing, or it may be a group of photos or drawings. It may comprise a landscape, such as a beach scene, a mountain scene, or a city-scape.

The verification image candidates may be stock images stored on storage 115 for display to and use by the user, or they may be clip art images stored at any suitable location accessible from across the Internet 150. Alternatively, the set-up system 110 may allow for a user to access personal verification images or to upload them into storage 115 using the profile module 220, the communications module 240, and the user information module 116 associated with the server 130. It may allow for the user to browse personal files to select desired verification images or to scan desired images (through a scanning device 125). Further, using the profile module 220, the communications module 240, and the user information module 116, the set-up system 110 may allow for a user to create a collage of any suitable verification image candidates to use as a verification image.

Accordingly a verification image may be a family portrait (the user's or any other family) containing multiple individuals or props, or it may be a portrait of people or pets. It may be a collage of photos or drawings of flowers, trees, office supplies, dinosaurs, toys, or lighthouses, combined by the user into a customized verification image collage.

The image-based set-up system may present random verification image candidates to the user, or it may allow the user to browse through the user's stored personal verification images on storage 115 or across the Internet 150 to select a verification image.

The user may select the challenge verification image from among verification image candidates presented to the user interface with the presentation module 250 and the communications module 240, or the communications module 240 may allow the user to submit the challenge verification image through the user interface. Alternatively, the user may choose one of her previous verification images in order to change the key definition associated with the previous verification image. Further, in other embodiments, the stage 430 may allow the user to select a verification image already stored as a verification image/key definition combination in storage 115 in order to reset the key for the selected verification image.

Figure 5A:
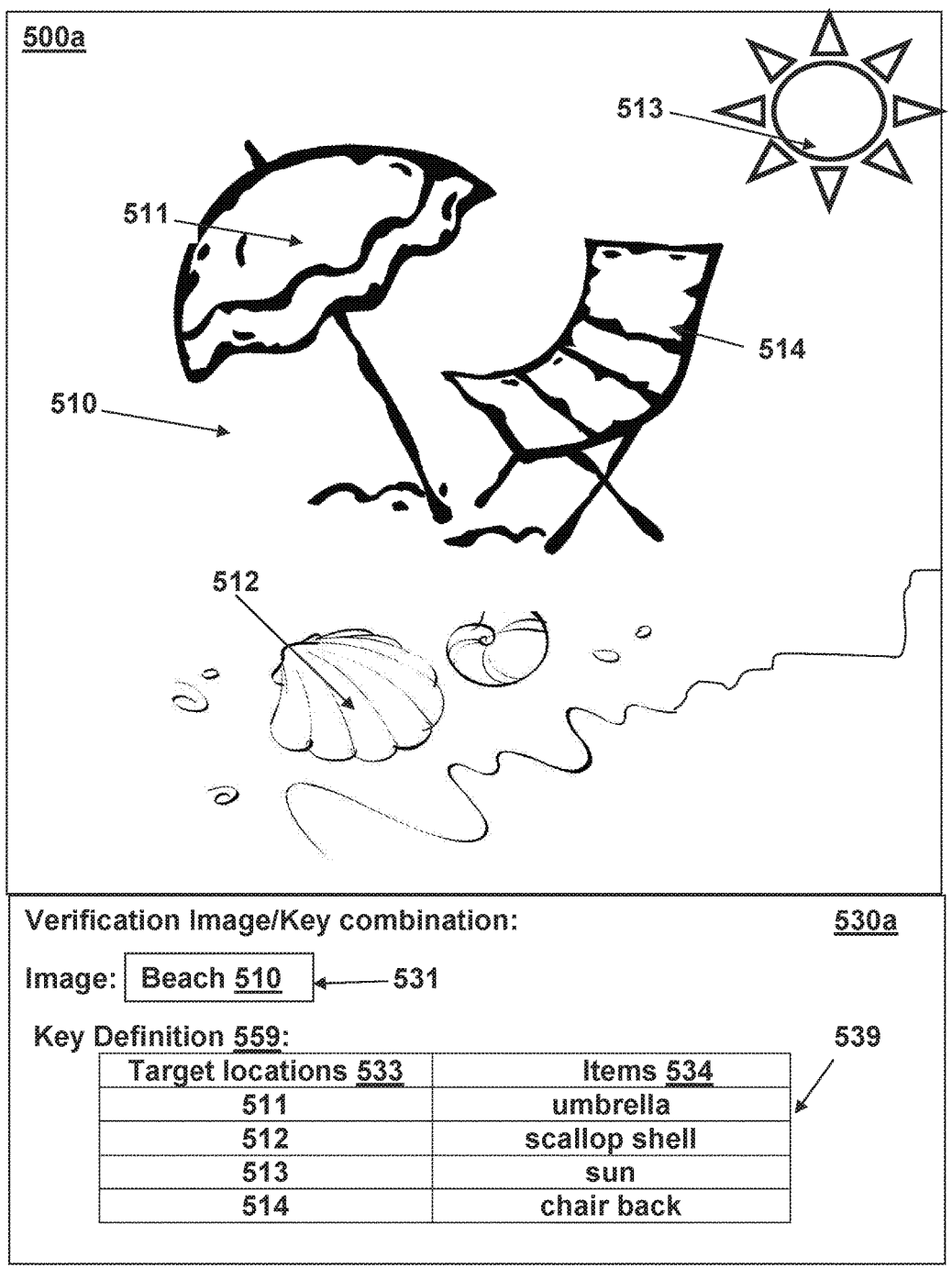
FIG. 5a is a diagrammatic representation of a display screen 500a on a user's interface, displaying a verification image for use in conjunction with the user verification application of FIG. 4.
Figure 5B:
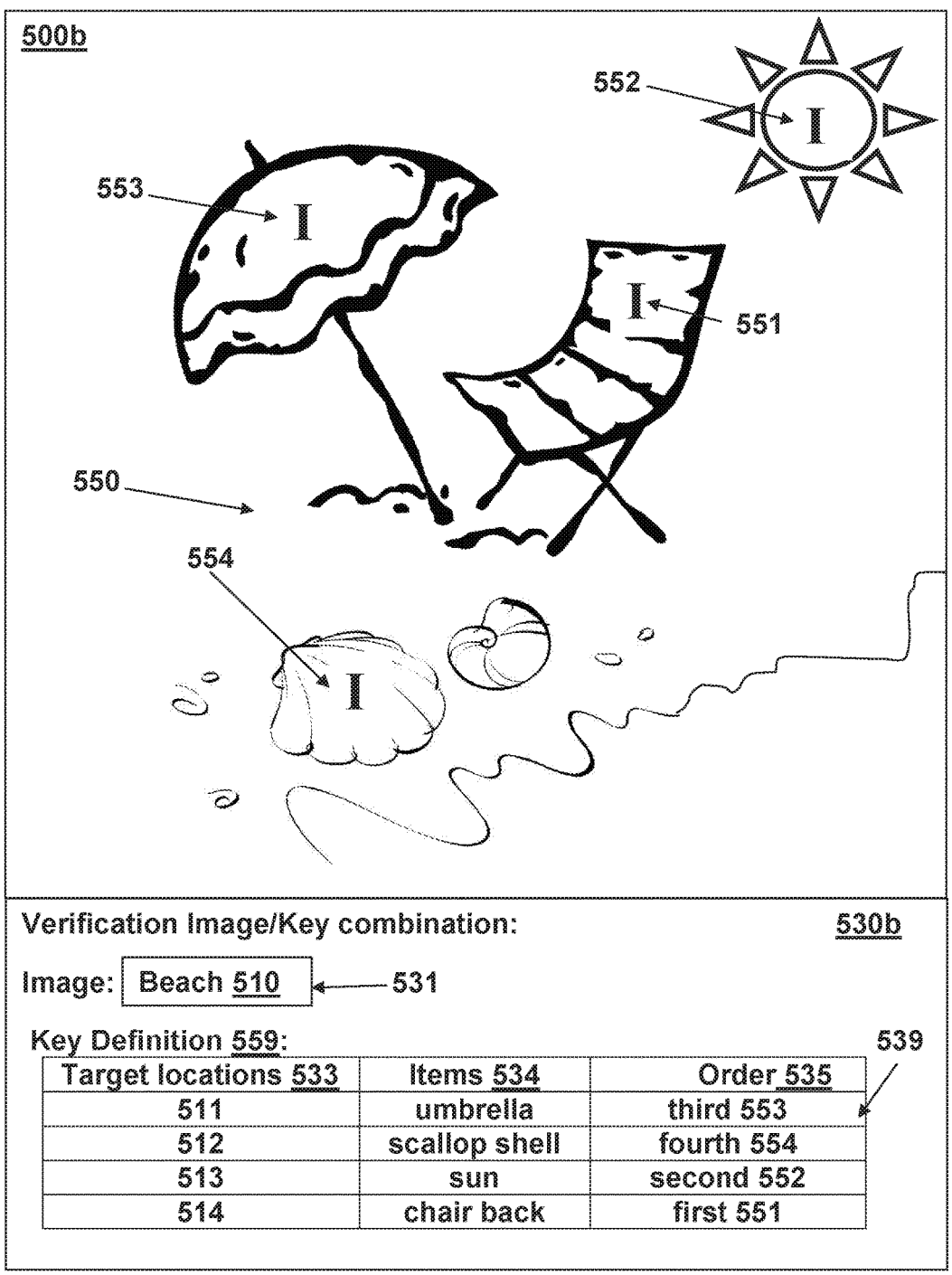
FIG. 5b is a diagrammatic representation of the display screen 500b, with an image-based and ordered selection key applied thereto.

FIGS. 5a, 5b are diagrammatic representations of a display screen on a user's interface, displaying an exemplary verification image for use in conjunction with the user verification application of FIG. 4. FIG. 5a shows the display screen 500a showing an exemplary verification image 510 and a key definition section 530 during the process of the user applying a image-based key 550 to the image 510, and FIG. 5b shows the display screen 500b with an exemplary image-based key 550 applied to an exemplary verification image 510. As shown in FIG. 5a, the user may select a beach scene as a verification image 510, which is being displayed on display screen 500a.

Returning to FIG. 4, when the challenge verification image is accepted, in a stage 440, with an action capture module 260 and the communications module 240, the user may create a challenge key to be associated with the challenge verification image and submit the challenge key definition for the challenge key through the user interface. The user may then move to establish the components of the key 550 to be associated with the selected verification image.

The key may be a set of actions to be performed on target locations on the selected verification image, and a key definition may be an identification of the set of actions on the target locations that make up the key. The number of target locations in the key to be created for verification image 510 may be any number desired by the designer of the set-up system. For example, the designer may choose to allow 3-8 target locations.

Returning to FIG. 5a, at the user's discretion, once the image 510 is selected, the user may select the target locations components of the key 550 to be associated with the selected verification image 510. The selection may occur in any manner suitable for the user and system designer. For example, the selection may occur by selecting the target location with a computer input device, such as a mouse, track ball, or joy stick. If the user interface has a touch screen, the selection may occur by tapping on or touching the target location. The communications module 240 and an action capture module 260 may be used with the user interface to record the selected actions. In the exemplary embodiment of FIG. 5a, the user may select the umbrella as target location 511, the scallop shell as target location 512, the sun as target location 513, and the chair back as target location 514. The set of actions that the user defines to be the key definition 535 may be recorded in a verification image/key definition combination section 530a of the display screen 500a. The section 530a may or may not be shown to the user during definition. The section 530a has a verification image field 531 where an identifier for image 510 may be displayed. The section 530a also has a key definition field 539 for displaying the key definition 559 for the key 550. As shown in FIG. 5a, the key definition field 539 may display the target locations 511, 512, 513, 514 in a locations field 533 and their respective associated items umbrella, scallop shell, sun, and chair back in an items field 534.

For additional security, the key 550 may also have an additional component such as selecting target locations in a predetermined selection order in order to form a series of actions to be performed on a verification image. An exemplary selection order for the series of actions is shown in FIG. 5b, in a Verification Image/Key Definition combination section 530b of a display screen 500b. The section 530b may have an order field 535 in key definition field 539 for displaying the order in which the actions associated with the target locations 511, 512, 513, 514 may occur. For example, in the exemplary key 550, as shown in the order field 535, the target locations 511, 512, 513, 514 may be selected in the following order: first selection 551 at target location 514, second selection 552 at target location 513, third selection 553 at target location 511, and fourth selection 554 at target location 512, respectively.

Figure 5C:
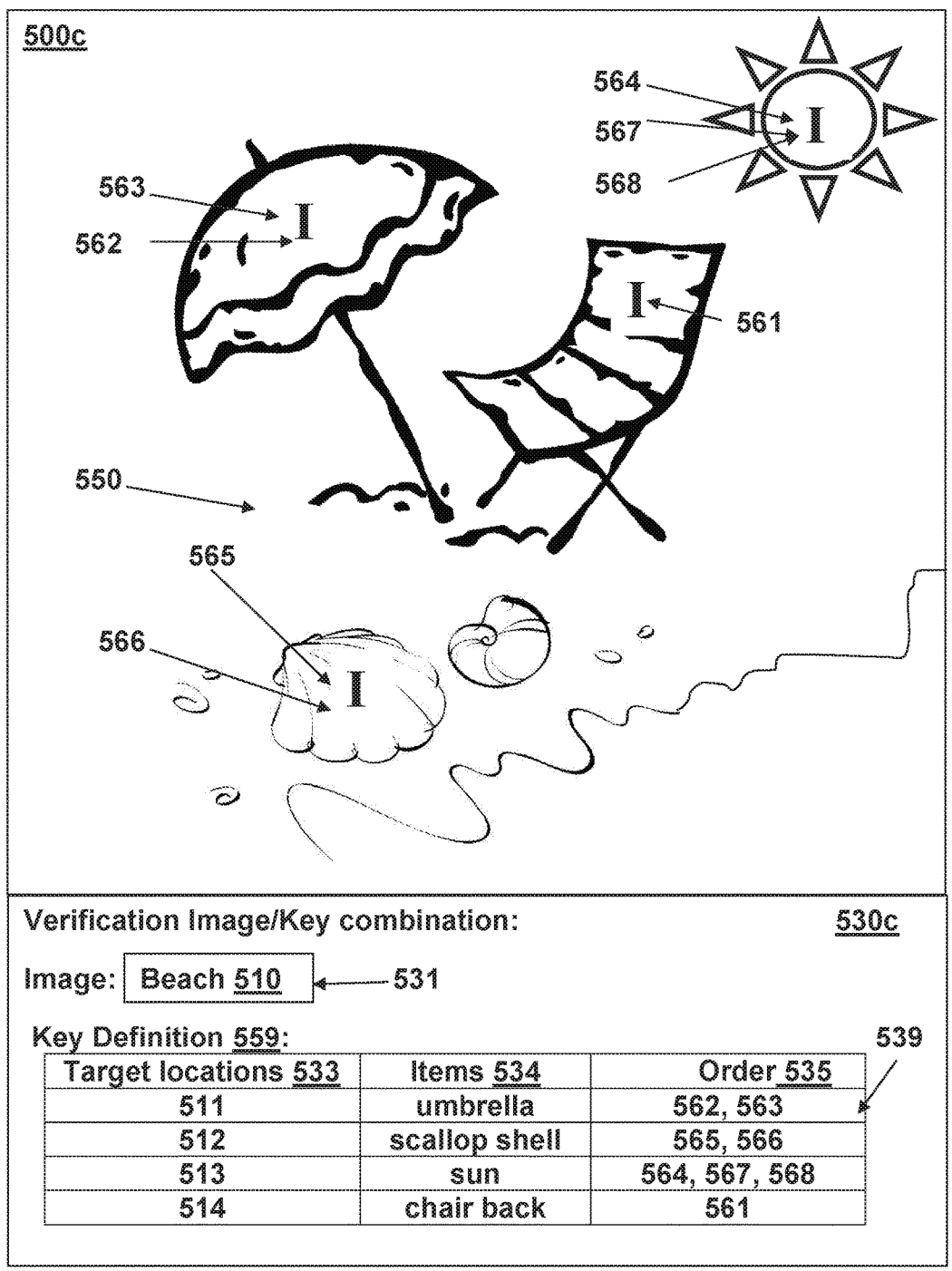
FIG. 5c is a diagrammatic representation of the display screen 500c, with an image-based, and ordered multi-touch selection key applied thereto.

For additional security, the key 550 may also allow the target locations to be selected multiple times, either sequentially or again after another target location is selected during the series of actions. An exemplary selection order for the series of actions in which target locations may be selected multiple times is shown in FIG. 5c, in a Verification Image/Key Definition Combination section 530c of a display screen 500c. The order field 535 of the key definition field 539 may display the multiple times that an associated action may occur. For example, in the exemplary key 550, the target locations 511, 512, 513, 514 may be selected in the following order: first selection 561 on the chair back, second selection 562 and third selection 563 at on the umbrella, fourth selection 564 on the sun, fifth selection 565 and sixth selection 566 on the scallop shell, and seventh selection 567 and eighth selection 568 back to the sun.

In one embodiment, the key associated with the selected verification image is unique. In other embodiments, keys for different verification images could be identical or similar. The series of actions to be performed on the selected verification image may have at least one of the following key components: selecting at least one target location on a selected verification image, as shown in FIG. 5a, selecting target locations in a predetermined selection order as shown in FIG. 5b, or selecting the target locations with a predetermined selection pattern as shown in FIG. 5c.

For additional security, in a further embodiment, the set of actions may also include selecting at least one overlay with which to cover the at least one target location or superimposing a target location with a selected overlay. The series of actions may also include covering the target locations with one or more overlays in a predetermined superimposing order; or covering the target locations with the overlays in a predetermined superimposing pattern. For even further security, once a target location is covered with an overlay, the overlay may fade out or vanish, either immediately upon being applied or with a delay.

FIG. 6 is an alternative embodiment of a stage 430a for the set-up process 400, in which the user establishes a key for a verification image using target locations and overlays. Stage 430a may have a stage 610, in which the user selects a verification image, and a stage 620, in which the user selects an overlay set to be associated with the selected verification image.

Figure 7A:
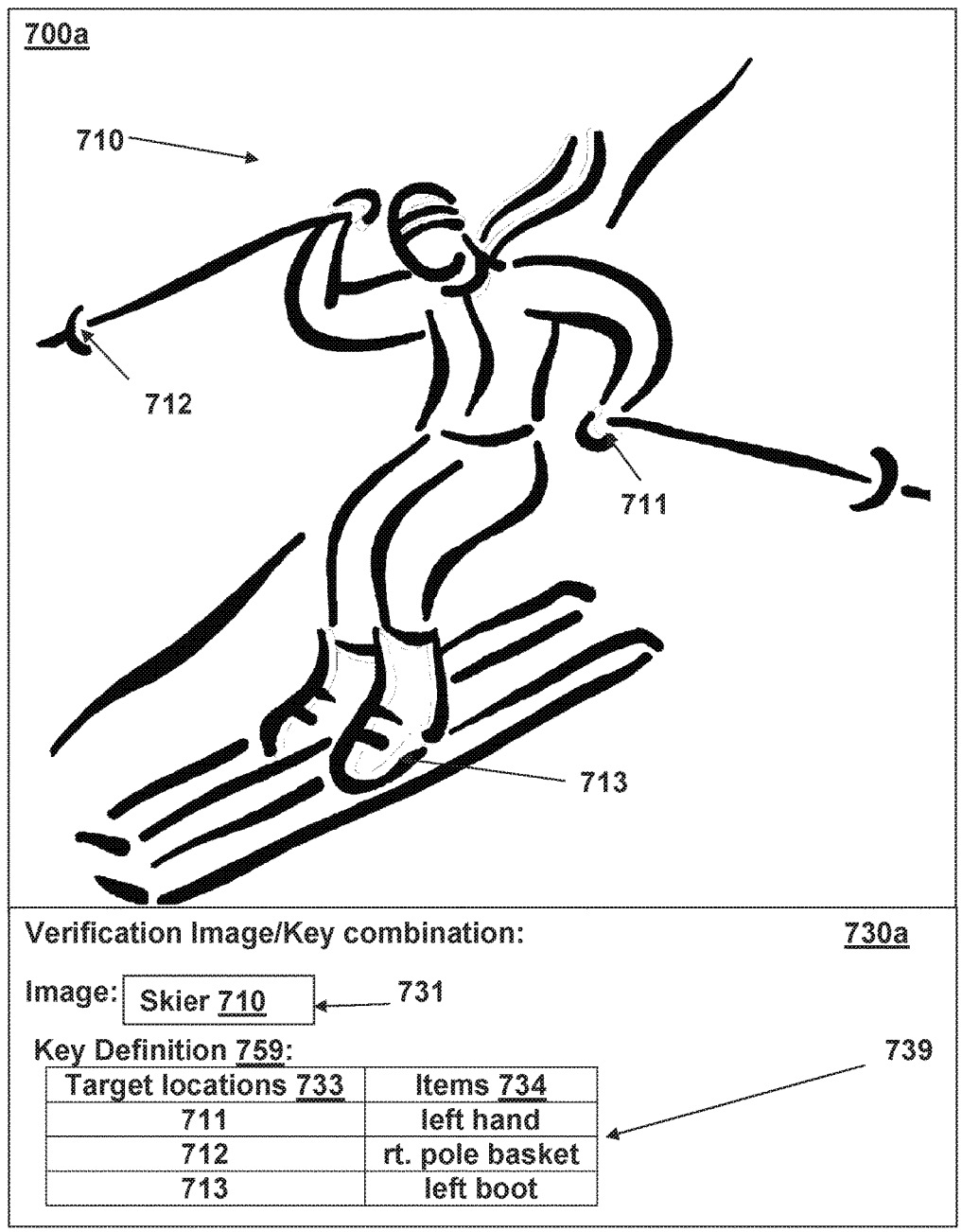
FIG. 7a is a diagrammatic representation of a display screen 700a on a user's interface, displaying an exemplary verification image for use in conjunction with the user verification application of FIGS. 4 and 6.
Figure 7B:
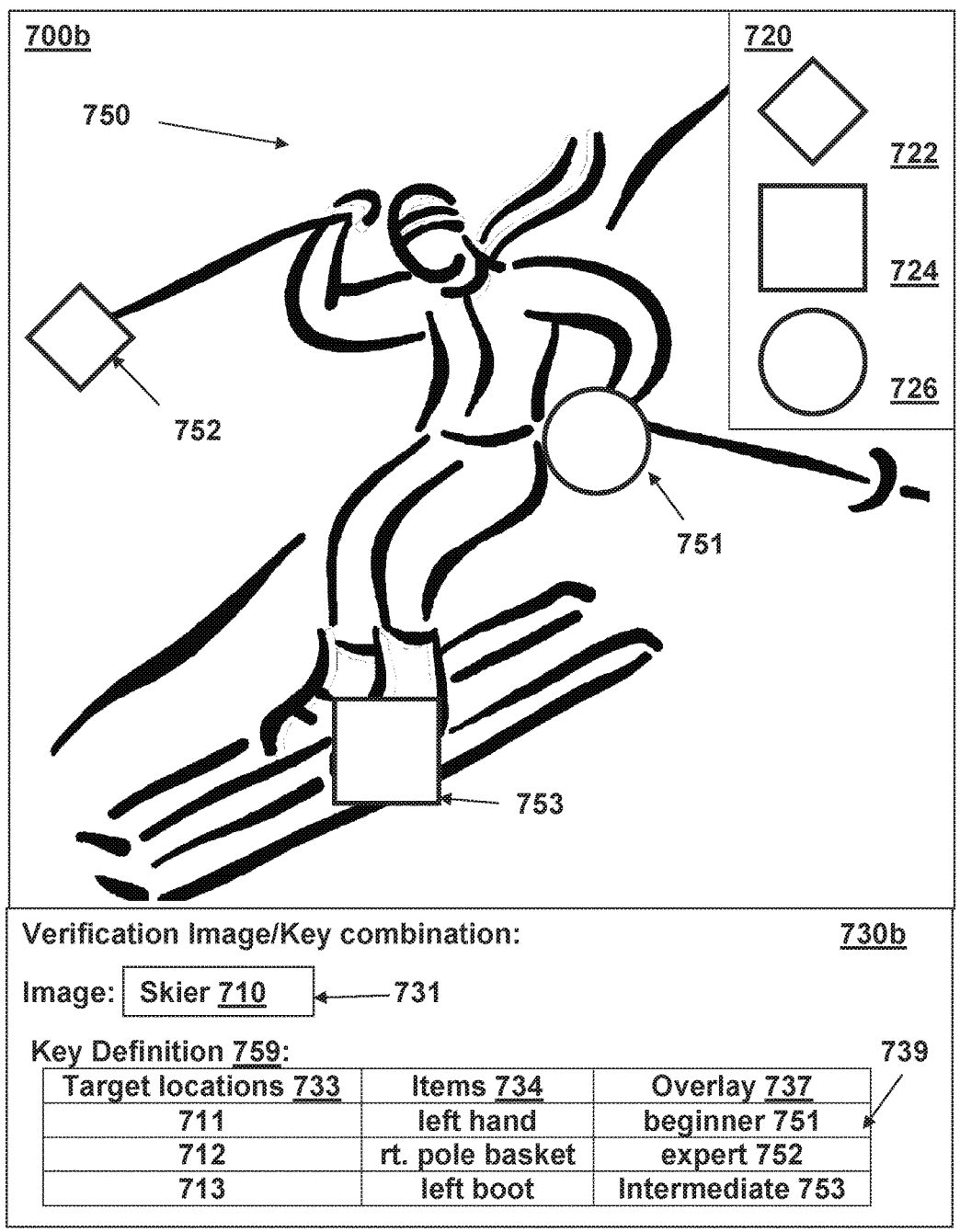
FIG. 7b is a diagrammatic representation of the display screen 700b, with an exemplary image-based and overlay-based key applied thereto.
Figure 7C:
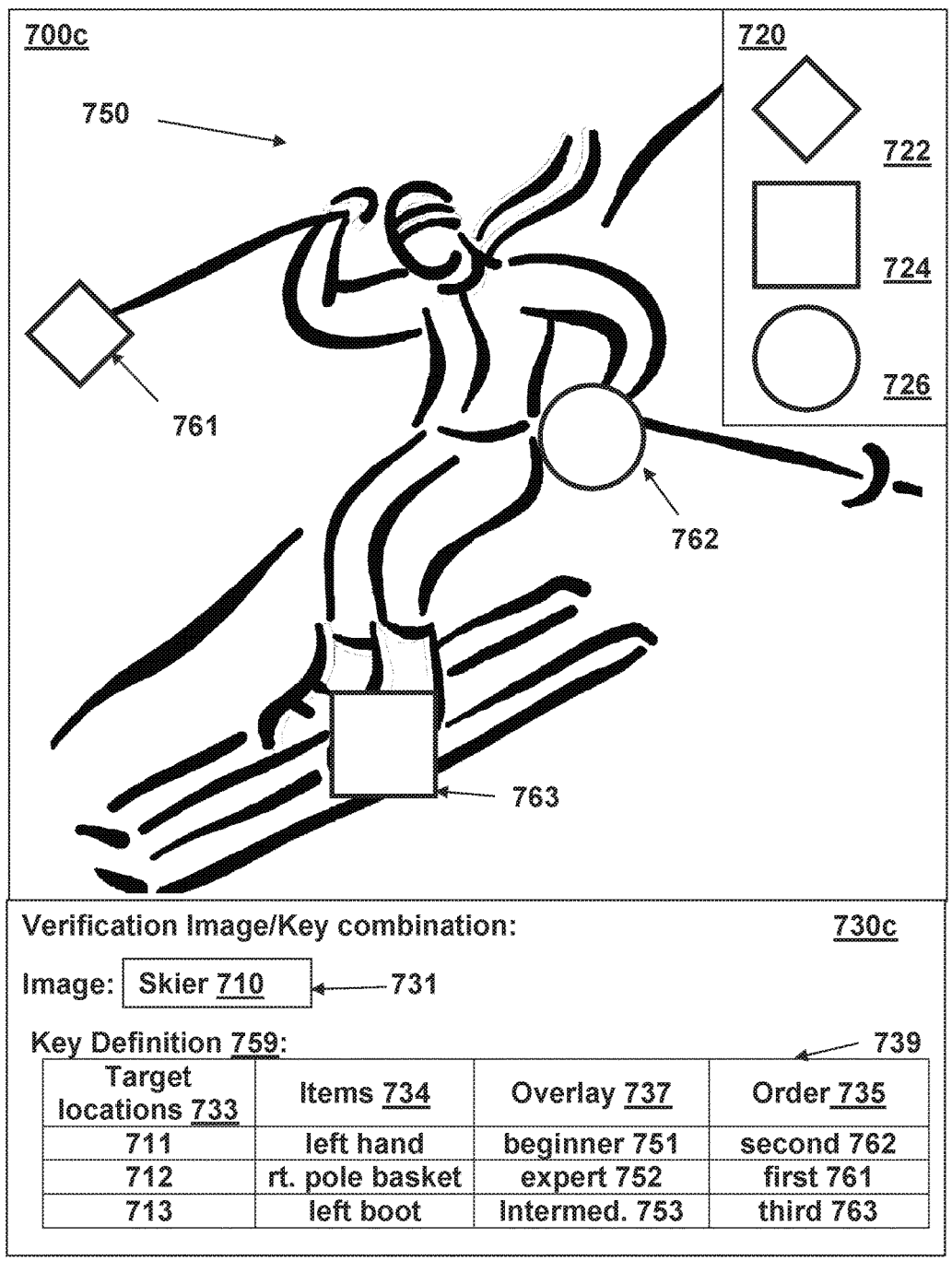
FIG. 7c is a diagrammatic representation of the display screen 700c, with an exemplary image-based, overlay-based, and ordered selection key applied thereto.

FIGS. 7a, 7b, 7c are diagrammatic representations of a display screen on a user's interface, displaying a verification image for use in conjunction with the user verification application of FIG. 4. FIG. 7a shows the display screen 700a before the user applies the key to the image, and FIG. 7b shows the display screen 700b with an image-based and overlay-based key applied to the verification image. FIG. 7c is a diagrammatic representation of the display screen 700c, with an image-based, overlay-based, and ordered selection key applied thereto. In FIGS. 7a, 7b, 7c the selected verification image 710 is a skier.

At the user's discretion, once the image 710 is selected in a stage 610, the user may select the target locations components of the key 750 to be associated with the selected verification image 710 in a stage 620. In one embodiment of the user authentication system, a user may define any region of a verification image as a target location during the process of developing verification image-key definition combinations. In that case, the position of a target location is defined by the "footprint" on the display of the mechanism used to select the location. For example, if the selecting mechanism is a stylus or pointer (having a small contact area relative to the size of the target location, the position of the target location may be recorded as the selected region of the verification image impinged upon by the selecting mechanism, or it could be the selected region plus a selected amount of region around the selected region. The amount of additional region may be made selectable at the discretion of the designer of the user authentication set-up system, depending upon the desired sensitivity or security of the user authentication system.

If the selecting mechanism has a larger contact area relative to the size of the target location (such as is the case if the display is a touch screen and the selection mechanism is a finger), the area of the verification image impinged upon by the larger selecting mechanism may be recorded as the position of the target location.

The designer of the user authentication system may provide on the user interface a dropdown list, input field, or other choice options for the user to use to identify the type of selection mechanisms to be used in order to determine the sizing rules to apply in selecting the area of the target location to record. Alternatively, the system designer may allow the processor to identify the type of stylus, and therefore the sizing rules to apply in selecting the area of the target location to record, based on the type of selection mechanism employed by the user.

In other embodiments, a verification image has pre-loaded target locations for a user to select when he or she develops an image-based password. The pre-loaded target locations may be displayed on the verification image (in highlighting or another color or in another conventional manner), so that the user may select among them as an intended target location, using a selection mechanism. If the "footprint" of the contact surface of the selection mechanism is smaller than the candidate target locations, the user need only click within a candidate target location to select it as a target location for the key definition for the displayed verification image. The position of the selected entire intended target location is recorded as part of the key definition for the displayed verification image. If the selecting mechanism has a larger contact area relative to the size of the target location (such as if it is a finger), the processor may either store the image region so selected as the position of the target location, or it may search within the selected region for a position of one of the pre-loaded target locations, and, if one is found, record its position as the position of the selected target location. If more than one is found, the selection may fail and the give the user one or more opportunities (depending on security considerations) to select another target location or the same target location with a more accurate selection mechanism.

The set of actions that the user defines to be the key definition 735 may be recorded in the Verification Image/Key definition combination section 730a of the display screen 700a. The section 730a may have a verification image field 731, to identify the image 710 may be displayed, and a key definition field 739 for displaying the key definition 759 for the key 750, displaying the target locations 711, 712, 713 in a locations field 733 and their respective associated items, the skier's left hand, the skiers right pole basket, and the skier's left boot in an items field 734.

For additional security, the key 750 may also have an additional component such as overlaying the selected target locations. The overlays may be any suitable image or set of images. An overlay may be any image (photos, drawings, icons, or shapes), or a set of related symbols may be chosen to form a set of overlays. For example, card suit symbols, ski trail symbols, sports logos, emoticons, musical notation, numbers, or letters are all possible candidates to serve as a set of overlays. The image-based set-up system may allow for the user to choose overlays in any manner, such as those disclosed above for selecting verification images, including a user selecting personal overlays or choosing stock overlays stored in a database in storage 115 for display to and use by the user.

An exemplary set of overlays for the key 750 is shown in FIG. 7b, in an overlay field 720 of a display screen 500b. In the exemplary embodiment shown in FIG. 7a, the set of symbols for ski trails forms the set of overlays. The expert trail symbol, a diamond, may be selected by the user for overlay 722, the intermediate trail symbol, a square, may be selected by the user for overlay 724, and the easiest trail symbol, a circle, may be selected by the user for overlay 726.

The user may then associate the overlays 722, 724, 726 with the selected target locations, for example, associating overlay 722 with target location 712 (the skiers left hand) to form an overlay selection 751, associating overlay 724 with target location 714 (the skier's right pole basket) to form an overlay selection 752, and associating overlay 726 with target location 716 (the skier's left boot) to form an overlay selection 753. The user may perform the associations using the action capture module 260 and communication module 240. The section 730b may have an overlay field 735 in the key definition field 739 for displaying the overlay selections 751, 752, 753 for the target locations 711, 712, 713.

For additional security, the key 750 may also have additional components such as selecting target locations in a predetermined selection order (as shown with reference to FIG. 7c). A key having a series of actions in which overlays are superimposed over target locations in a selected order is shown in FIG. 7c, in a Verification Image/Key Definition Combination section 730c of a display screen 700c. The order field 735 of the key definition field 739 may display the order that an associated action may occur. For example, in the exemplary key 750, the target locations 711, 712, 713 may be superimposed by overlays in the following order: first selection 761 on the skier's right pole basket, second selection 762 on the skier's left hand, and third selection 763 on the skier's left boot.

The action taken by the user in establishing the key either may be chosen by the system designer or the user. In certain embodiments, the computer system has pre-loaded challenge actions for the user to select when he or she develops an image-based password. The pre-loaded actions may be displayed on the verification image at the target locations (in highlighting or another color or in another conventional manner) in the order in which they are to be performed on the verification image. The computer system may present the pattern multiple times to allow the user to learn the key.

Capture of the actions may be implemented with the action capture module 260 and the communication module 240. For example, the selected overlays may be superimposed on the target locations in their intended order of action in the key definition. Alternatively, they first may be superimposed on the target locations, and in a second step, the overlays may be selected on the target locations in a specific order to define the order of selection for the key. Further alternatively, the user may fill in a table such as one disclosed below with reference to FIG. 8b to define target locations, overlay and order of action.

In further embodiments, superimposing overlays may be performed dragging an overlay to over a target location, or it may occur by cursor—selecting an overlay, and then selecting a target location to accomplish the superimposing activity. Selecting overlays may occur in the same manner as disclosed above for selecting target locations. It may be understood that selected overlays for superimposing over target locations may be unique.

Figure 8A:
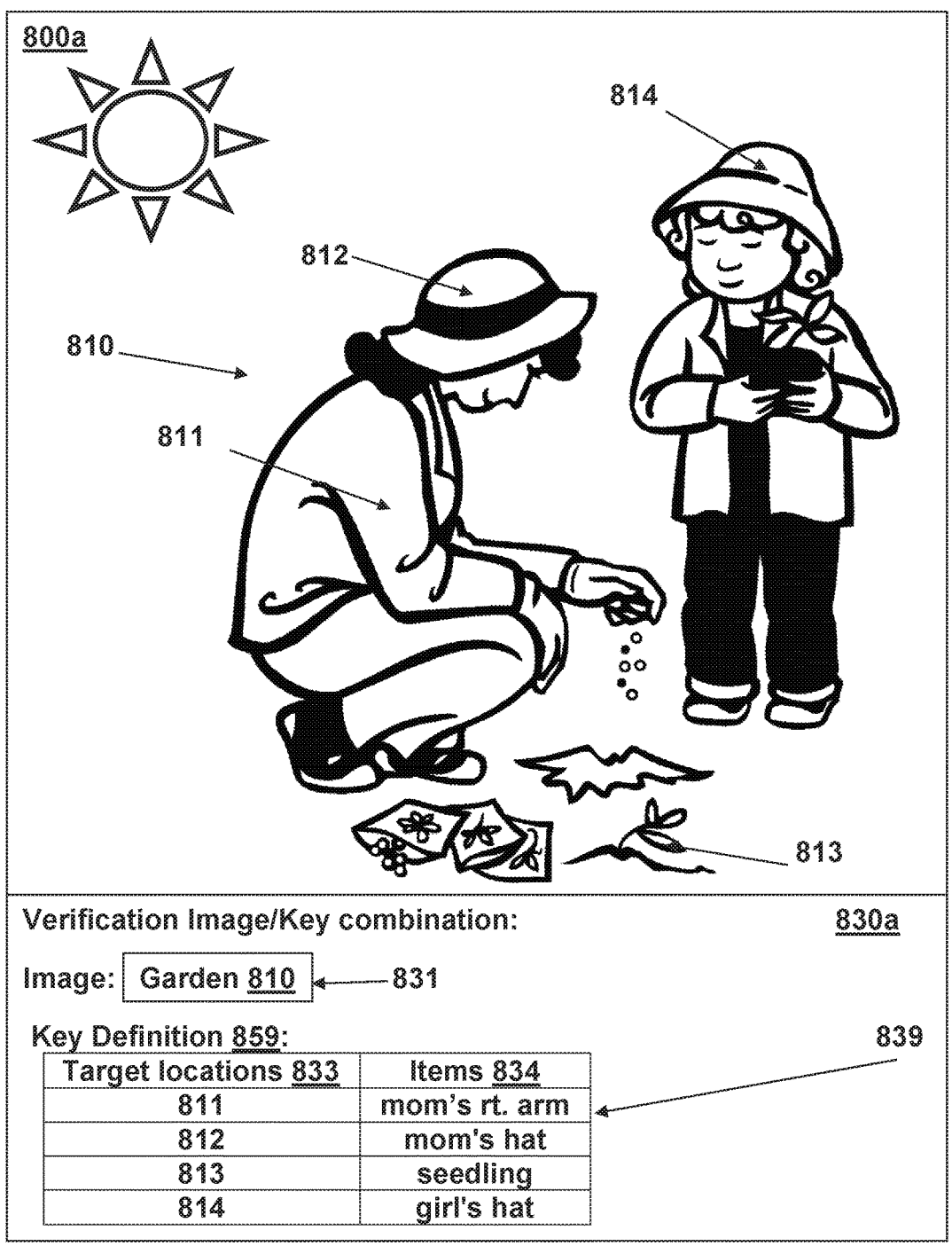
FIG. 8a is a diagrammatic representation of a display screen on a user's interface, displaying another verification image for use in conjunction with the user verification application of FIGS. 4 and 7.
Figure 8B:
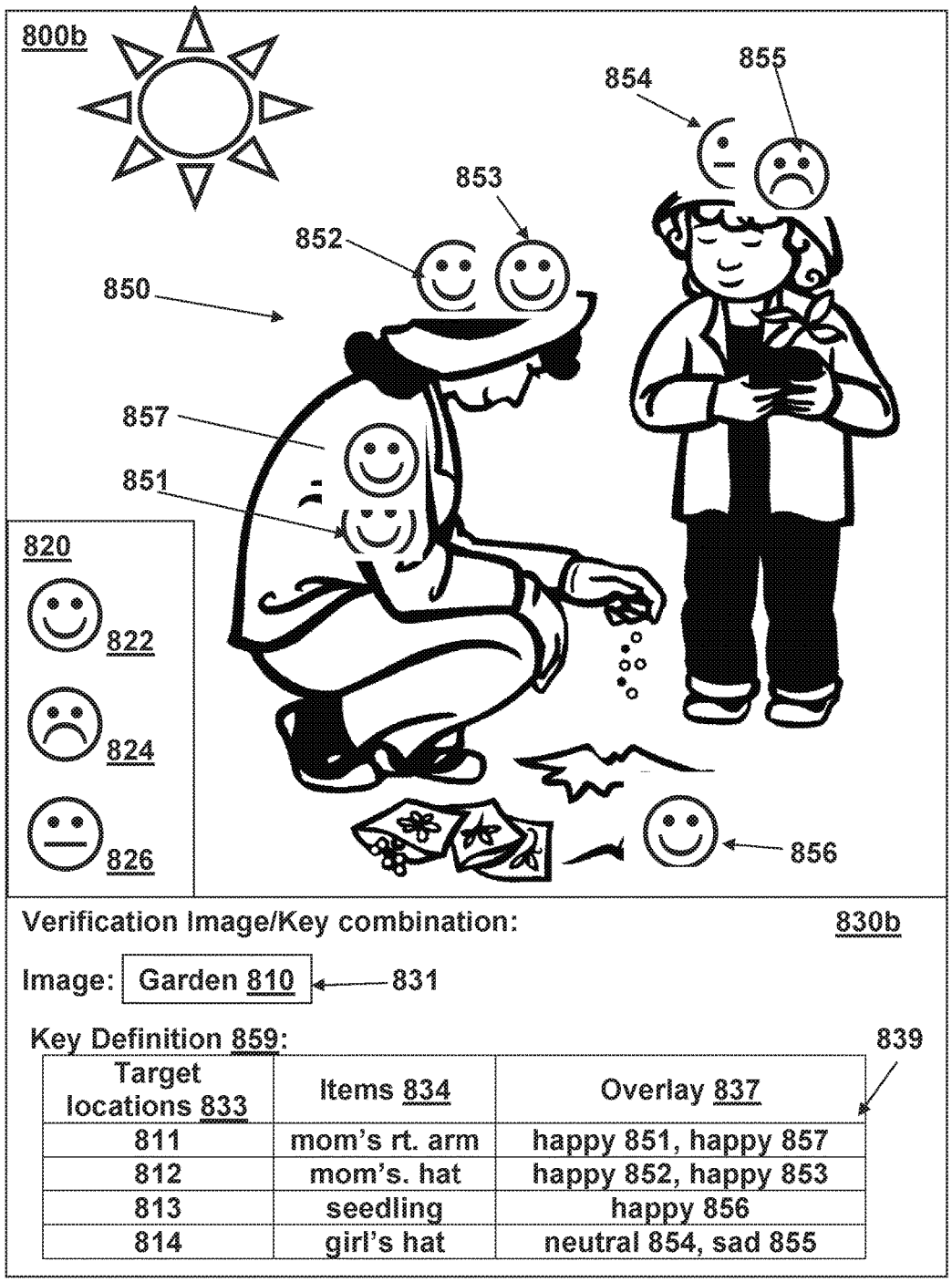

FIGS. 8a, 8b are diagrammatic representations of a display screen on a user's interface, displaying another embodiment of a verification image for use in conjunction with the user verification application of FIG. 4. FIG. 8a shows the display screen 800b with an image-based, overlay-based, ordered selection, and multi-selection pattern key applied to the verification image. In FIGS. 8a, 8b, the selected verification image 810 is a mother and daughter gardening.

The set of actions that the user defines to be the key definition 835 may be recorded in the verification image/key definition combination section 830a of the display screen 800a. The section 830a may have a verification image field 831, to identify the image 810, and a key definition field 839 for displaying the key definition 859 for the key 850, displaying the target locations 811, 812, 813, 814 in a locations field 833 and their respective associated items, the mother's right arm, the mother's hat, the seedling, and the girl's hat, in an items field 834.

The key 850 may also have overlays for superimposing the selected target locations. An exemplary set of emoticon overlays for the key 850 is shown in FIG. 8b, in an overlay field 820 of a display screen 800b. A happy face may be selected by the user for overlay 822, sad face for overlay 824, and a neutral face for overlay 826.

The user may develop a key in which multiple target locations are covered with multiple overlays in a superimposing pattern. For example, the user may make the following overlay selections: associate overlay 822 (the happy face) with target location 811 (the mother's right arm) to form a first overlay selection 851, associating overlay 822 with target locations 811, 812 (the mother's hat) to form a second overlay selection 852 and third overlay section 853, and so on as outlined in the following chart. As shown in FIG. 8b, the section 830b may have an overlay field 837 in the key definition field 839 for displaying the overlay selections 851-857 for the target locations 811-814.

| Action Order | Target Location | Overlay |
| --- | --- | --- |
| first overlay selection 851 | mother's right arm 811 | happy face 822 |
| second overlay selection 852 | mother's hat 812 | happy face 822 |
| third overlay selection 853 | mother's hat 812 | happy face 822 |
| fourth overlay selection 854 | girl's hat 814 | neutral face 826 |
| fifth overlay selection 855 | girl's hat 814 | sad face 824 |
| sixth overlay selection 856 | seedling 813 | happy face 822 |
| seventh overlay selection 857 | mother's right arm 811 | happy face 822 |

The predetermined superimposing order for covering the target locations with overlays may be unique for each image. Alternatively, the user may choose to have an identical or similar pattern for each image. Thus, it may be seen that a target location may be covered only once, or it may be covered multiple times with the same or a different overlay, either sequentially or again after another target location is covered during the series of actions.

Returning to FIG. 4, in response to receipt in a stage 450 by the set-up system 110 of the challenge key definition, the key definition may be associated in a stage 460 with the challenge verification image using the set-up module 270 to form a new verification image/key definition combination. In a stage 470, information related to the new verification image/key definition combination may be stored with the user information on the storage 115 by the storage module 280 and the user information module 116 associated with the server 130.

Further, in other embodiments, a stage 480 may be provided to allow for review, proofreading, editing, and/or approval of verification image/key definition combinations. In a stage 410, using the processor 130 and the modules of the set-up application 132, one or more verification image/key definition combinations may be retrieved from the storage 115 and presented to the user to allow for review, proofreading, editing, and/or approval activities. If changes are made, information related to any updated verification image/key definition combinations may be stored with the user information on the storage 115 by the storage module 280 and the user information module 116 associated with the server 130.

Conducting Computer-Based User Authentication with Image-Based Log-Ins

Figure 9:
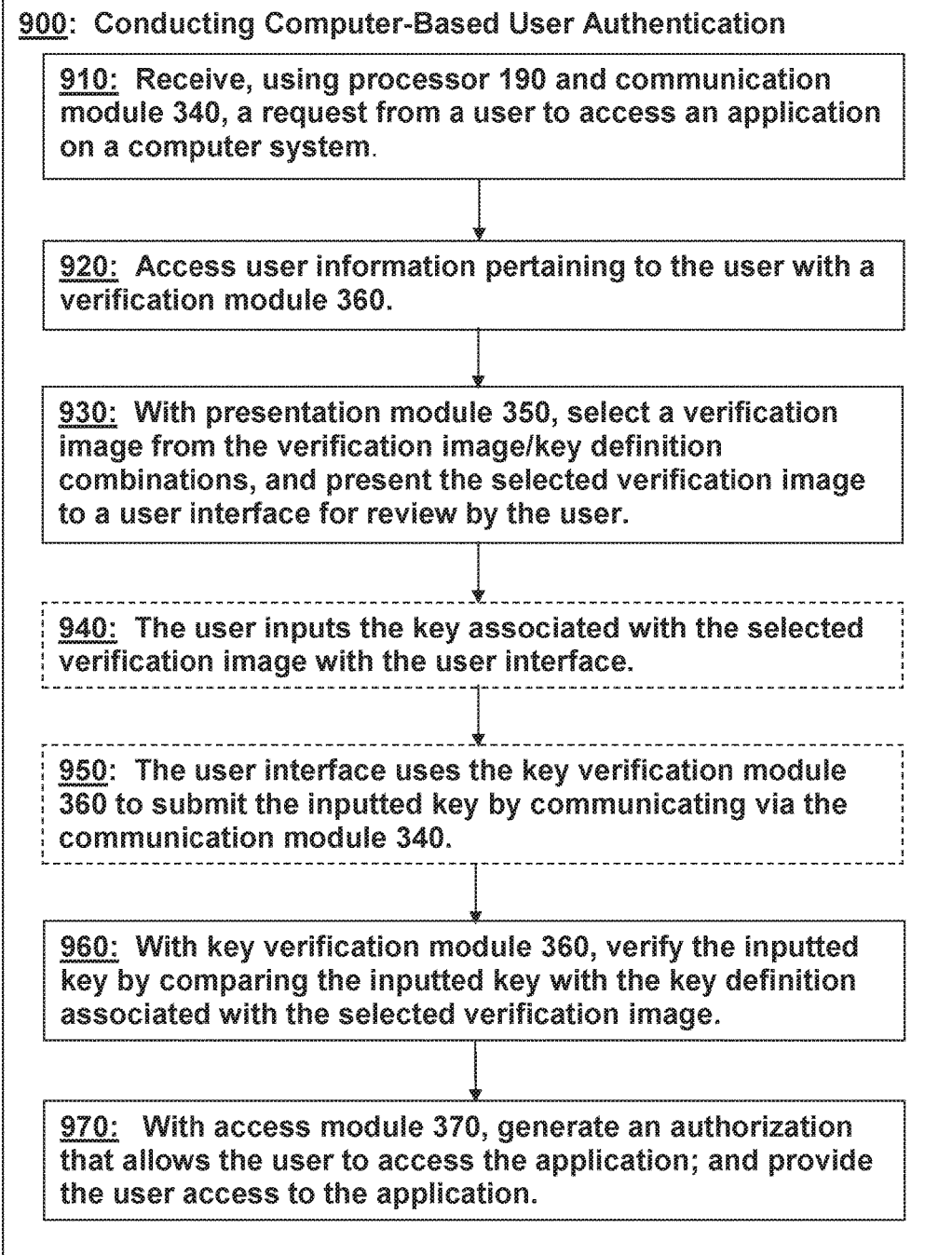
FIG. 9 is a block diagram of an embodiment of the user verification application of FIG. 2.

FIG. 9 illustrates an exemplary process 900 for conducting computer-based user authentication in which a user performs a set of actions on at least one verification image on a display screen. In one embodiment, in a stage 910, using the processor 190 and the communication module 340, a request is received from a user to access an application on a computer system. In response to receiving the request to access an application, in a stage 920, the key verification module 360 may access information pertaining to the user. The user information, including a plurality of verification image/key definition combinations, may be accessed from a user information module 176 on the server 190.

In a stage 930, with the presentation module 350, a verification image may be selected from the plurality of verification image/key definition combinations and presented to a user interface for review by the user. The user interface may be the same user interface as is used in the key set-up process or may be a separate verification user interface. The verification system may select the verification image to be displayed randomly or in any suitable way. Further, the verification system may display a different verification image each time that a user attempts verification.

The user interface may have a reselect button to allow the user to select another verification image if the user forgets the key to be associated with a displayed verification image or for other reasons wants to input a key onto a different verification image. For additional security, the number of times that a user may operate the reselect button or attempt to log in may be limited such that the user is prevented from logging in after a selected number of attempts. The user interface may also have a hint button to allow the user to request that a hint about the key associated with the displayed verification image is sent to the user's email or cell phone. The hint may be a portion of or all actions in the key definition. The key may be presented to the user in the form of a chart such as disclosed above in reference to key 850. Additional security, such as correct responses to challenge questions, may be required in order to preserve the confidentiality of the key definition.

When the user in a stage 940 inputs the key associated with the presented verification image with the user interface, the user interface may submit the inputted key in a stage 950 by communicating via the communication module 340 with the key verification module 360. The user may input the key associated with the displayed verification image by performing the set of actions on the selected verification image in the same manner as selected and captured for the displayed verification image set during the set-up stage.

Any conventional matching method may be employed to match the selected region on the screen with an intended target location, as that information is stored in the key definition for the selected verification image. In one embodiment of user verification, a user may select a target location on a verification image using a variety of selection mechanisms. For example, the selecting mechanism may be a stylus or pointer (having a small contact area relative to the size of the intended target location). The designer of the user authentication system may design the verification process so that the processor at the user interface may search the key definition associated with the selected verification image to find a target location encompassing the user-selected region on the display screen. If one is found, it may be identified as the desired target location area. If more than one is found, conventional disambiguation techniques may be performed. For example, the target location closest to the selected region or having the largest area encompassed by the user-selected region may be identified as the desired target location area, or a conventional mathematical or statistical method may be used to identify the most likely target location as the desired target location. If disambiguation is not successful (no target location being reasonably near the user-selected region on the display screen, with "reasonably near" dictated by the accuracy, sensitivity and security considerations of the verification system), the login fails and the user may be given additional opportunities to login, at the discretion of the owner of the computer application or system.

To facilitate target location identification by the user's processor, the verification system designer may provide on the user interface a dropdown list, input field, or other choice options for the user to use to identify the type of selection mechanisms being used to select an area as a target location. Alternatively, the system designer may allow the processor to identify the type of selection mechanism, and therefore the sizing rules to apply, based on the type of selection mechanism employed by the user.

In a stage 960, the inputted key may be verified with the key verification module 360 by comparing the inputted key with the key definition associated with the presented verification image. The verification system provides verification when the key performed on the verification image matches the stored key associated with the verification image.

In response to the presentation module 350 verifying the inputted key, in a stage 970 an access module 370 generates an authorization that allows the user to access the application and the user is provided access to the application.

Encrypting Components of Image-Based Password

Figure 10:
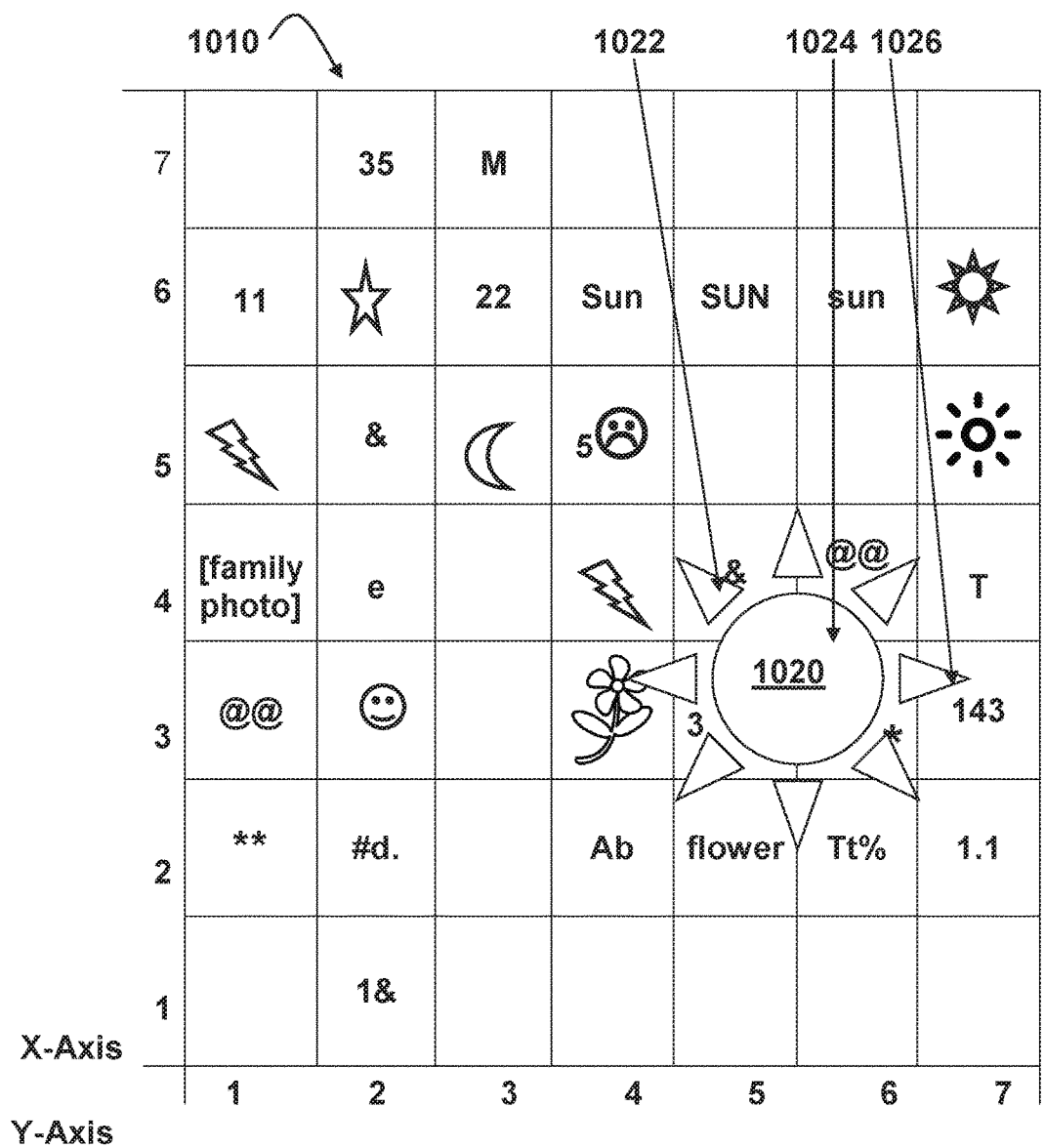
FIG. 10 is a diagrammatic representation of a grid for a verification image for use with an exemplary computer-based user authentication system.

Additional security may be provided to a computer-based authentication system by encrypting at least one of the components of the image-based password. For example, encryption may be established for the information related to target locations so that their positions on a verification image are not transmitted using their coordinates (such as their x/y coordinates according to the Cartesian coordinate system). In one embodiment, a grid may be established for a display of a verification image. The grid cells may be uniquely specified according to their locations relative to x- and y-axes. The cells may be populated with elements of content so that the content of the grid cells that coincide with a target location may be used to define an encryption for the target location. For illustrative purposes, FIG. 10 shows a grid 1010 with 49 cells arranged in a 7×7 array on a verification image with one target location. The size of the grid is at the choice of the designer of the image-based password encryption system, who may also be the designer of the computer-based authentication system. Such designer may choose to have the grid cover a verification image with multiple target locations, in which case FIG. 10 would represent the grid 1010 for a portion of a display screen.

As shown in FIG. 10, the grid's cells have associated with them an element of content. The cells may have random elements associated therewith, or they may be chosen by the designer of the image-based password encryption system. An element of content may be one or more alpha-numeric characters, special characters (&, %, #, ©, and the like), an image (such as a photo, picture, emoticon or drawing), a word or phrase. For example cell (1, 6) of grid 1010 has an "11" and cell (2, 6) has a star.

In certain embodiments such as the one shown in FIG. 10, letters may be case sensitive so that the content of various cells may be a word represented in a variety of formats. For example, grid 1010 is shown with cell (4, 6) having the word "Sun" (Sentence case), cell (5, 6) having the word "SUN" (all caps), and cell (6, 6) having the word "sun" (lower case). Further, a word could be the content of a one cell and one or more images of the word could be the content in another cell, for example, cell (7, 6) and cell (7, 5) have different images of the sun. In addition, the content may be a single element or a combination, for example a number and an emoticon such as in cell (1, 3) with @@ and cell (2, 2) with the character string #d,1.

As noted above, when a user select target locations on a verification image during the set-up process, in one embodiment, the user may choose any position on the verification image, and the position of a target location is defined by the position on the display of the mechanism used to select the location.

When the verification image has pre-loaded target locations, a user selects a target location and the position of a target location is defined by the position information stored with the information about the verification image. Position information about the position of the target location may be encrypted from the elements of content associated with the grid cells upon which the target location impinge. For example, referring to FIG. 10 and FIG. 11, one pre-loaded target location, an image of a sun 1020, is displayed in grid cells (5, 2), (6, 2), (4, 3)-(7, 3), (5, 4)-(7,4). The elements of content associated with the sun target location, and therefore the encryption for the position of the sun 1020 target location, is (the lower case word "flower," "Tt %," an image of a flower, "3," "*," "143," "@@"). Another pre-loaded target location, an image of a sun ray 1022, is displayed in grid cell (5, 4) with the element of content associated with the sun ray 1022 target location, and therefore the encryption for the position of the sun ray 1022 target location, being ("&"). A third preloaded target location, an image of another sun ray 1024, is displayed in grid cells (6, 3)-(7, 3) with the elements of content associated with the sun ray 1024 target location, and therefore the encryption for the position of the sun 1024 target location, being (*, 143).

It is to be understood that, whether the target location is pre-loaded or its position is selected by a user, encryptions may be defined as above by applying a grid to a verification image and associating the contents of grid cells to a target location on the verification image, from a practical viewpoint, a user may not be able to select exactly the same set of grid cells as the set that defines the target location on the verification image, and therefore would define a different position for a target location.

When the target location is in only one grid cell and the selection mechanism is sensitive enough to select only one grid cell, the selected target location would be the same as the target location identified in the verification image/key definition combination. For example, the sun ray 1022 is only found in Cell (5, 4), resulting in an encryption of its position as (&), and so would be selectable by a selecting object with a selector contact area that is smaller than the area of a grid cell. However, if the target location or the selector contact of the selection device are larger than one grid cell, selecting a target location position will require additional rules.

For example, a stylus or a cursor, having a small selector contact and therefore providing a more sensitive touch, may select fewer grid cells than those in a target location's position definition. On the other hand, a stylus, a cursor, or a finger, having a larger selector contact and therefore providing an outsized touch, may select more grid cells than those in a target location's position definition. Referring to FIGS. 10-11, the target location position of the image of the sun 1020 is grid cells (5, 2), (6, 2), (4, 3)-(7, 3), (5, 4)-(7,4). A stylus may select the sun 1020 by pointing to one or more of the cells (5, 3)-(6, 4), and a finger may select the sun 1020 by pointing to at least cells (4, 2)-(7, 4). Thus a set of selected grid cells can be significantly different from the grid cells in a target location's position definition; the resultant target locations encryptions (as shown in FIG. 11) can be seen to be significantly different as well.

One solution is to associate the set of selected grid cells with a target location position definition, and then create an encryption for the position of the selected grid cells from the content of the grid cells in the target location position definition. A decision whether a selected set of grid cells identifies a target location may be made by the grid module using any conventional matching or disambiguating methodologies such as those similar ones disclosed above with respect to target location identification during the verification process. Instructions may be provided in the grid module to compare a selected set of grid cells against target location's position definitions in order to determine whether they define the grid cells of any target location's position definition. The instructions may be provided in the grid module to accept information about the size of grid cells and target locations relative to the contact size of the employed selection mechanism, and to associate a selected set of grid cells as a target location's position based on the contact surface size of the selection mechanism and on the status of the selected grids cells as supersets or subsets.

- A set of grid cells that was selected using a selection mechanism with a contact surface size smaller than the size of a target location and that is a subset of the grid cells in a target location's position definition may be associated with the target location.
- A set of grid cells that was selected by a selection mechanism with a contact surface size that is larger than the size of a target location and that is a superset of the grid cells in a target location's position definition may be associated with the target location.

After such association, the grid cells in a target location's position definition may then replace the selected set of grid cells, and the target location position may be encrypted from the content of the grid cells in a target location's position definition.

In other embodiments, likelihood estimators may be used to match a set of selected grid cells to target location position definitions. The sensitivity of the matching may be at the option of the designer of the image-based log-in development system, so that settings may be provided to adjust for the desired level of system security and sensitivity. For example, referring to FIG. 10, the sun ray 1022 at cell (5, 4) is a potential target location. However, in selecting the target location, for example by touching the sun ray 1022, a user may touch cell (5, 4) or the touch may also extend to cell (4, 4) as well as cell (5, 4). Further, depending on the size of the cells and the user's finger, the touch may also extend to cell (4, 3) as well as cell (5, 3). Depending on the desired level of system security and sensitivity, the designer of the image-based log-in development system may choose to define how accurate a touch would need to be to constitute a target location identification. In another embodiment, the designer may choose to have, as part of the set-up system 110, a sensitivity selection option to allow the user to select the sensitivity during the setup of the verification image/key definition combinations.

In one embodiment, the target location encryption so generated is unique so that it may be used to uniquely identify a challenge target location in the computer-based user authentication systems and methods disclosed herein. In other embodiments, when the target location encryption is not unique, and other identifying information about the target location may be associated with the target location encryption to allow the target location encryption to uniquely identify a location on the verification image.

In certain embodiments, uniqueness of the target location encryption may be ensured by making an element of content of each cell unique. When each cell of a set of contiguous grid cells has unique content, the string of content from the cells will necessarily be unique. In other embodiments, elements of content may be repeated in cells, like in FIG. 10, where the image of the lightning bolt is in cell (1, 5) and cell (4, 4).

However, when elements of content are repeated in cells, rules may be developed in order to ensure unique content for a set of contiguous cells that define a target location. For example, the use of a sufficient number of elements of content for a grid will reduce the likelihood that sets of contiguous cells will have identical content because the more types of content, the lower the likelihood that a set of content will be the same. Further, causing contiguous cells to be identified as an ordered set will further reduce the likelihood that sets of contiguous cells will have identical content. In addition, a set of content placement rules forbidding identical combinations of content of contiguous cells may be developed and enforced. Alternatively, when target location candidates are being considered, they may be tested against combinations of other contiguous cells to determine whether the combinations of content of contiguous cells are unique, and if not their use may be forbidden by the grid development method and system.

FIG. 12 illustrates an exemplary process 1200 for developing additional security for a component of a multi-component password such as the image-based password disclosed herein. In one embodiment, in a stage 1210, using the processor 190 and the communication module 340, a request to provide additional security to a component of a multi-component password such as the image-based password disclosed herein. The request may come from a user or it may come from instructions in an application 136 for providing additional protection to a component of a password and for controlling the timing of providing additional protection to a component.

In a stage 1215, a decision is made, based on characteristics of the password to be additionally secured, as to which component to protect additionally, and how to do it. The decisions made in stage 1215 may be based on which if any security operations have already been performed on the password in general and on the components of the password individually or together. In certain embodiments, a selected security operation may be chosen because it has not yet been performed on any component of the password, or it may be chosen because it already had been performed on other components. A first security operation may be chosen to be performed on a component because it complements a second security operation that has already been performed on another component. Further, a decision may be made to perform the same or different security operation on one, some, or all of the components, depending on the security objectives of the system designer. The decision may also have a time plan for performing the security operation(s) on the component(s) according to a time plan. For example, a decision may be made to apply a security operation to a component, and then to follow up by performing the same or different security operations on the other components of the password. In the embodiment disclosed herein the decision is made to establish protection for target locations, and to do it by encrypting one or more target locations.

In response to receiving the request to access an application, in a stage 1220, a grid module 290 in set-up application 132 may define a grid, including its size to be associated with verification images of the verification image/key definition combinations. At the option of the designer of the target location encryption system, a grid may be defined before any verification image/key definition combinations are established. In a stage 1230, the grid module 290 may populate the grid with elements of content for its cells. The grid module 290 may also ensure the unique content for a set of contiguous cells that define a target location or a potential target location as disclosed above. In a stage 1240, the grid module 136 may store information about the established grid definition in any suitable storage, such as storage unit 115 or storage unit 175. Using the communication module, the grid module may transmit information about the established grid definition to a storage unit at users' devices such as computer 120 or telephone such as a mobile telephone 160 with which the users will communicate with the authentication system 100.

By storing the information with which target locations are encrypted on both the user and processor sides of the user authentication system, an additional layer of protection (providing additional encryption above the networking encryption provided during logins) is provided to the image-based passwords because positions of target locations are not transmitted using their coordinates on an x/y axis. By providing additional encryption for a subset of the image-based password (the other components of which include verification images, overlays, challenge actions, and login actions), breaking the password after its interception becomes more complicated (an additional task—the breaking of the encryption of the target locations—is added to the task of breaking the password) and so security of the entire image-based password is enhanced. In addition, transmitting the encrypting defining information independently from the transmission of the image-based password components makes breaking the image-based password even more difficult to decipher because the key to the positions of target locations will not be included in the intercepted password transmission.

In certain embodiments, instructions in the grid application 136 may have a stage 1250 for invoking set-up application 132 to replace or re-shuffle the elements of content in a grid in order to redefine target location encryptions. The instructions may be made periodically at intervals considered suitable by the system designer, randomly or on demand. In a stage 1260, the grid module 136 may replace the information about the established grid definition with information about a revised grid definition in any suitable storage at the processor side of the user authentication system. Using the communication module, the grid module 136 may transmit information about the revised grid definition to a storage unit at users' devices.

Modifying the target location encryption and substituting it at both the user and processor sides of the user authentication system, again independently from the transmissions of the image-based password, provides an additional layer of protection to the image based passwords. Should a thief (perhaps by watching a user input an image based password) discover all of the components of the password and attempt to use it, and should the verification system present the same verification image to the thief (an unlikely event in itself because the system allows for selection of the verification image from multiple verification images), the thief will be unsuccessful in using the misappropriated password when the target locations' encryption had been changed before the thief's attempt to use the image-based password.

It may be seen that the embodiments of the systems and methods disclosed here may be used to greatly facilitate remembering passwords and logging in to computer-based social networks. The described system, which revolves around the image-based authentication, may provide more discreet and secure logins. It may also be seen that the embodiments of the systems and methods disclosed here may be used to greatly enhance the security of transmitting the image-based passwords disclosed herein. The encryption of selected components of the image-based password, may provide even more secure logins.

One of skill in the art will appreciate that the above-described stages may be embodied in distinct software modules. Although the disclosed components have been described above as being separate and consolidated units, one of ordinary skill in the art will recognize that functionalities provided by one or more units may be combined or separated, at the option of the developer. As one of ordinary skill in the art will appreciate, one or more of units may be optional and may be omitted from implementations in certain embodiments. For example, the computer 120 may have an application, not shown, having modules that are similar to the modules of application 162 in order to allow for the operation of the set-up system 110 and verification system 170. In addition, in the methods and systems for encrypting selected components of an image-based password, one grid with elements of content is developed to be applied over all of the verification images selected to be displayed as part of the image-based password selection and computer-based user verification. At the option of the designer of the image-based user authentication system, more than one grid could be developed so that certain verification images (up to all of the images) share a grid. In certain embodiments, the encryption management may even change the number of grids used in the system at any time, so long as the grid information at both the user and processor sides of the user authentication system is synchronized.

It is to be understood that the systems and methods disclosed herein may not be limited to use with providing additional security to an image-based password, nor should it be limited to providing additional security to target locations of a verification image in an image-based password described herein, nor also should it be limited to encrypting the positions of the target locations. The processes and methods disclosed herein may be used to provide additional security to any component in any multi-component password, with the additional security being chosen as appropriate for the component and the password. For example, another component of a multi-component password may be include two images where different types of actions are to be performed on each image. Alternatively, a system in which actions would need to be performed on an image and a set of text-based set of questions answered might have only one component encrypted or answered in particular unidentified orders. Further, in the image-based password disclosed here, the identification of the verification image selected for display could be additionally encrypted, or the selection of which challenge actions to perform may have required an additional password to be entered before verification could even be attempted. In addition, any and all of the actions to be performed on a verification image could be defined and identified by the position on the x/y axis of the region of the verification image upon which its action is operated instead of with reference to the position of the target location upon which it is operated, and could be encrypted in whole or in part. Further, all or only designated images in a set of image overlays (for example the drag and drop shapes as described above) may be encrypted.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments. For example, the described implementations may be implemented in software, hardware, or a combination of hardware and software. Examples of hardware include computing or processing systems, such as personal computers, servers, laptops, tablets, mainframes, micro-processors, and processing systems within so-called "smart" phones. It is intended that the specification and examples be considered as exemplary only, with a true scope and spirit of the invention being indicated by the following claims.

The invention claimed is:

1. A system, comprising:
 a computer system having a processor and a memory; and
 a non-transitory computer-readable medium encoding instructions for computer-based user authentication and for execution by the processor, the instructions programmed to cause the processor to
  receive, into the memory, a request to establish or enhance security for an image based password having a plurality of components, one component of which comprises a verification image having a plurality of target locations, one target location of which comprising a selected target location with a region upon which actions could be applied; and
  in response to receiving the request to establish or enhance the security for the image-based password, encrypt information related to position of the selected target location on the verification image.

2. The system of claim 1, wherein a security operation has not been performed on at least one other component of the image-based password.

3. The system of claim 1, wherein the instructions programmed to cause the processor to encrypt the information related to the position of the selected target location on the verification image further comprise instructions programmed to cause the processor to:
 establish a grid for the verification image to uniquely identify the position of the selected target location on the verification image by grid cells associated therewith;
 populate the grid cells with elements of content in order to define an encryption of the identified position of the selected target location on the verification image based on the content of the grid cells associated with the position of the selected target location; and maintain information related to the grid and its grid cells at a user processor and at the computer system for use in encrypting and decrypting the identified position of the selected target location on the verification image.

4. The system of claim 3, further comprising instructions programmed to cause the processor to redefine the encryption of the identified position of the selected target location on the verification image by modifying the elements of content in the grid cells;

storing information related to the modified grid cells at the user processor and at the computer system; and performing the encrypting and decrypting of the identified position of the selected target on the verification image using the information related to the modified grid cells.

5. A method, comprising:

receiving, into a memory associated with a processor, a request to establish or enhance security for an image-based password having a plurality of components, one component of which comprises a verification image having a plurality of target locations, one target location of which comprising a selected target location with a region upon which actions could be applied; and in response to receiving the request to establish or enhance the security for the image-based password, the computer system encrypting information related to position of the selected target location on the verification image.

6. The method of claim 5, wherein a security operation has not been performed on at least one other component of the image-based password.

7. The method of claim 5, wherein the computer system encrypting the information related to the position of the selected target location on the verification image further comprises the computer system:

establishing a grid for the verification image to uniquely identify the position of the selected target location on the verification image by grid cells associated therewith;

populating the grid cells with elements of content in order to define an encryption of the identified position of the selected target location on the verification image based on the content of the grid cells associated with the position of the selected target location; and maintaining information related to the grid and its grid cells at a user processor and at the computer system for use in encrypting and decrypting the identified position of the selected target location on the verification image.

8. The method of claim 7, further comprising the computer system redefining the encryption of the identified position of the selected target location on the verification image by modifying the elements of content in the grid cells, storing information related to the modified grid cells at the user processor and at the computer system; and performing the encrypting and decrypting of the identified position of the selected target location on the verification image using the information related to the modified grid cells.

9. One or more computer-readable, nontransitory media, having stored thereon one or more computer programs programmed to cause a computer to:

receive, into a memory of the computer, a request to establish or enhance security for an image-based password having a plurality of components, one component of which comprises a verification image having a plurality of target locations, one target location of which comprising a selected target location with a region upon which actions could be applied; and in response to receiving the request to establish or enhance the security for the image-based password, encrypting information related to position of the selected target location on the verification image.

10. The one or more computer-readable, nontransitory media of claim 9, wherein a security operation has not been performed on at least one other component of the image-based password.

11. The one or more computer-readable, nontransitory media of claim 9, wherein causing a computer to encrypt the information related to the position of the selected target location on the verification image further comprises causing a computer to:

establish a grid for a verification image to uniquely identify the position of the selected target location on the verification image by grid cells associated therewith;

populate the grid cells with elements of content in order to define an encryption of the identified position of the selected target location on the verification image based on the content of the grid cells associated with the position of the selected target; and maintain information related to the grid and its grid cells at a user processor and at the computer system for use in encrypting and decrypting the identified position of the selected target location on the verification image.

12. The one or more computer-readable, nontransitory media of claim 11, further comprising causing a computer to redefine the encryption of the identified position of the selected target location on the verification image by modifying the elements of content in the grid cells, storing information related to the modified grid cells at the user processor and at the computer system; and performing the encrypting and decrypting of the identified position of the selected target location on the verification image using the information related to the modified grid cells.

* * * * *